United States Patent
Borloz et al.

(10) Patent No.: US 9,228,696 B2
(45) Date of Patent: Jan. 5, 2016

(54) VARIABLE HEIGHT ARM STRUCTURES, SYSTEMS, AND METHODS

(75) Inventors: Paul Rene Borloz, Petaluma, CA (US); Joshua Kawarii Littlefield, Santa Rosa, CA (US); Cristian J. Daugbjerg, Novato, CA (US)

(73) Assignee: GCX CORPORATION, Petaluma, CA (US)

( * ) Notice: Subject to any disclaimer, the term of this patent is extended or adjusted under 35 U.S.C. 154(b) by 13 days.

(21) Appl. No.: 13/051,833

(22) Filed: Mar. 18, 2011

(65) Prior Publication Data

US 2012/0235000 A1    Sep. 20, 2012

(51) Int. Cl.
| | |
|---|---|
| A47F 5/00 | (2006.01) |
| F16M 13/02 | (2006.01) |
| F16M 11/04 | (2006.01) |
| F16M 11/08 | (2006.01) |
| F16M 11/20 | (2006.01) |
| F16M 11/24 | (2006.01) |
| F16M 11/42 | (2006.01) |

(52) U.S. Cl.
CPC ............. *F16M 13/02* (2013.01); *F16M 11/046* (2013.01); *F16M 11/048* (2013.01); *F16M 11/08* (2013.01); *F16M 11/2014* (2013.01); *F16M 11/2092* (2013.01); *F16M 11/24* (2013.01); *F16M 11/42* (2013.01); *F16M 2200/041* (2013.01)

(58) Field of Classification Search
CPC ... F16M 11/2021; F16M 11/04; F16M 13/02; F16M 11/10; F16M 11/12; F16M 11/06; F16M 2200/063; F16M 11/18; F16M 2200/04; F16M 2200/041; F16M 2200/044; F16M 2200/047; F16M 2200/048

USPC ............. 248/123.11, 280.11, 281.11, 279.1, 248/324, 325

See application file for complete search history.

(56) References Cited

U.S. PATENT DOCUMENTS

| | | | |
|---|---|---|---|
| 3,650,498 A | * | 3/1972 | Deak |
| 4,216,741 A | | 8/1980 | Moss |
| 4,453,687 A | | 6/1984 | Sweere |
| 4,567,732 A | | 2/1986 | Landstrom et al. |
| 4,836,478 A | | 6/1989 | Sweere |
| 4,844,387 A | | 7/1989 | Sorgi et al. |
| 5,101,593 A | | 4/1992 | Bhatt |

(Continued)

FOREIGN PATENT DOCUMENTS

| | | |
|---|---|---|
| EP | 129361 A2 | 12/1984 |
| EP | 1586925 A1 | 10/2005 |

(Continued)

*Primary Examiner* — Christopher Garft
(74) *Attorney, Agent, or Firm* — Michael A. Glenn; Perkins Coie LLP

(57) ABSTRACT

Enhanced variable-height mounting arms comprise structures that allow any of improved cleanability and/or improved adjustment of height or counterbalancing. An exemplary enhanced variable-height arm comprises an upper shell structure that substantially extends over the upper and side regions of the mounting arm, forming a four-bar linkage. A lower cover is mounted to the upper cover across the bottom side of the arm, and defines holes therethrough for extension of the opposing ends of the arm. The variable-height arm further comprises a bias element, wherein one end of the bias element is adjustably fixable in relation to a defined curve, non-linear path or slot, such as within a curved slot. The variable-height arm may preferably further comprise a mechanism for adjusting any of the height or counterbalance for the structure.

18 Claims, 18 Drawing Sheets

(56) References Cited

U.S. PATENT DOCUMENTS

| | | | |
|---|---|---|---|
| 5,108,063 A | 4/1992 | Koerber, Sr. et al. | |
| 5,315,834 A | 5/1994 | Garunts et al. | |
| 5,743,503 A * | 4/1998 | Voeller et al. | 248/284.1 |
| 5,799,917 A * | 9/1998 | Li | |
| 5,818,689 A | 10/1998 | Johns et al. | |
| 5,826,846 A | 10/1998 | Buccieri et al. | |
| 5,842,672 A | 12/1998 | Sweere et al. | |
| 5,876,008 A | 3/1999 | Sweere et al. | |
| 5,975,472 A * | 11/1999 | Hung | 248/278.1 |
| 6,012,693 A * | 1/2000 | Voeller et al. | 248/280.11 |
| 6,409,134 B1 * | 6/2002 | Oddsen, Jr. | 248/274.1 |
| 6,478,275 B1 * | 11/2002 | Huang | 248/284.1 |
| 6,578,319 B1 | 6/2003 | Cole et al. | |
| 6,592,090 B1 * | 7/2003 | Li | 248/284.1 |
| 7,014,157 B2 * | 3/2006 | Oddsen | 248/280.11 |
| 7,048,242 B2 | 5/2006 | Oddsen, Jr. | |
| D537,323 S | 2/2007 | Saez | |
| 7,188,812 B2 * | 3/2007 | Wang | 248/276.1 |
| 7,207,537 B2 * | 4/2007 | Hung | |
| D544,489 S | 6/2007 | Oddsen et al. | |
| 7,255,311 B2 * | 8/2007 | Metelski | |
| D555,657 S | 11/2007 | Loyd | |
| D556,205 S | 11/2007 | Wohlford et al. | |
| D557,125 S | 12/2007 | Worrall et al. | |
| 7,338,022 B2 * | 3/2008 | Hung et al. | 248/278.1 |
| 7,464,909 B2 * | 12/2008 | Li | 248/280.11 |
| D584,734 S | 1/2009 | Chu | |
| 7,540,457 B2 * | 6/2009 | Oddsen et al. | 248/278.1 |
| D598,917 S | 8/2009 | Luber | |
| 7,677,516 B2 * | 3/2010 | Oddsen, Jr. | 248/274.1 |
| 7,694,927 B2 | 4/2010 | Chuang | |
| D627,474 S | 11/2010 | Nordgren et al. | |
| D631,052 S | 1/2011 | Hung | |
| 8,070,114 B2 * | 12/2011 | Chen | 248/121 |
| 2002/0066843 A1 | 6/2002 | Oddsen, Jr. et al. | |
| 2003/0075653 A1 | 4/2003 | Li | |
| 2004/0245419 A1 * | 12/2004 | Sweere et al. | 248/276.1 |
| 2005/0055877 A1 | 3/2005 | Schomaker et al. | |
| 2005/0224664 A1 * | 10/2005 | Metelski | 248/123.11 |
| 2006/0032998 A1 | 2/2006 | Depay | |
| 2007/0040084 A1 * | 2/2007 | Sturman et al. | 248/280.11 |
| 2007/0295870 A1 * | 12/2007 | Peterson | |
| 2008/0054133 A1 | 3/2008 | Huang | |
| 2008/0197247 A1 | 8/2008 | Gotovac | |
| 2010/0019112 A1 * | 1/2010 | Chi | 248/281.11 |
| 2013/0180168 A1 | 7/2013 | Elliott | |

FOREIGN PATENT DOCUMENTS

| | | |
|---|---|---|
| GB | 2230946 A | 11/1990 |
| GB | 2416062 A | 1/2006 |
| JP | H10214034 | 8/1998 |
| JP | 2002149083 | 5/2002 |
| JP | 2002300496 | 10/2002 |
| JP | 2005531791 | 10/2005 |
| JP | 2006053211 | 2/2006 |
| WO | 9744553 A1 | 11/1997 |
| WO | 03041386 | 5/2013 |

* cited by examiner

VARIABLE HEIGHT ARM STRUCTURES, SYSTEMS, AND METHODS

FIELD OF THE INVENTION

The present invention relates to the field of mechanical arms. More particularly, the present invention relates to improved variable height mechanical arm structures and processes.

BACKGROUND OF THE INVENTION

Mechanical arms are often used to support a wide variety of devices, such as but not limited to display screens, touch screens or monitors. Such mechanical arms may often provide any of stationary, adjustable and/or movable support, wherein positioning or movement may provide lateral movement, rotation, tilt, and/or variation of height.

Mechanical arms are often used in a wide variety of biologically sensitive environments, such as but not limited to hospitals, laboratories, medical and/or dental offices, and hospices. However, many prior mechanical arms often include structures, e.g. such as but not limited to covers, fasteners, trim, and/or pivots, that are readily contaminated, such as by dirt, dust, grease, germs, blood, sweat, chemicals, and/or other materials. As well, such exposed mechanical structures are not highly or thoroughly cleanable.

As well, while some prior mechanical arms have provided adjustable height, such arms are not typically designed for frequent adjustment and heavy use. For many such structures, screen movement is typically sloppy, and joints loosen quickly. Furthermore, such designs typically include pinch points and/or exposed gaps, which are not readily cleanable.

It would therefore be advantageous to provide a mechanical arm structure that reduces the risk of contamination. The development of such a structure would constitute a major technological advance. As well, it would be further advantageous to provide such a structure that provides a high degree of cleanability. The development of such a structure would constitute a further technological advance.

While some prior conventional mechanical arms have provided some adjustability over a range of angles, such designs do not offer high performance over a full range of positions. For example, while a mechanical arm may be adjusted to provide adequate support within a central region of a range of motion for a monitor, adjustment of such an arm at a point toward the top of the range of motion often results in travel back downward towards center, unless friction of the assembly is increased to retain the monitor at the desired high position. Similarly, adjustment of such an arm at a point toward the bottom of the range of motion often results in travel back upward towards center, unless friction of the assembly is increased to retain the monitor at the desired low position.

Some prior mechanical arms having adjustable height have used gas springs having a pivot point at one end, which is mounted about a screw or bolt. Adjustment of the screw or bolt in such a configuration results in travel of the pivot point of the spring, along a line that is collinear to the travel of axis of the bolt, such that the leverage, i.e. the mechanical advantage applied by the gas spring, changes for any of different weights or different loads. In some such designs, the screw or bolt may be mounted at an angle to attempt to provide acceptable counterbalancing for different weights.

It would therefore be advantageous to provide a mechanical arm structure that provides a high degree of adjustability throughout a wide range of motion, without an undue requirement to apply friction to retain a chosen position of the arm. The development of such a structure would constitute a significant technological advance.

SUMMARY OF THE INVENTION

Enhanced variable-height mounting arms comprise structures that allow any of improved cleanability and/or improved adjustment of height or counterbalancing. An exemplary enhanced variable-height arm comprises an upper shell structure that substantially extends over the upper and side regions of the mounting arm, forming a four-bar linkage. A lower cover is mounted to the upper cover across the bottom side of the arm, and defines holes therethrough for extension of the opposing ends of the arm. The variable-height arm further comprises a bias element, wherein one end of the bias element is adjustably fixable in relation to a defined curve, non-linear path or slot, such as within a curved slot. The variable-height arm may preferably further comprise a mechanism for adjusting any of the height or counterbalance for the structure.

DETAILED DESCRIPTION OF PREFERRED EMBODIMENTS

Figure 1:
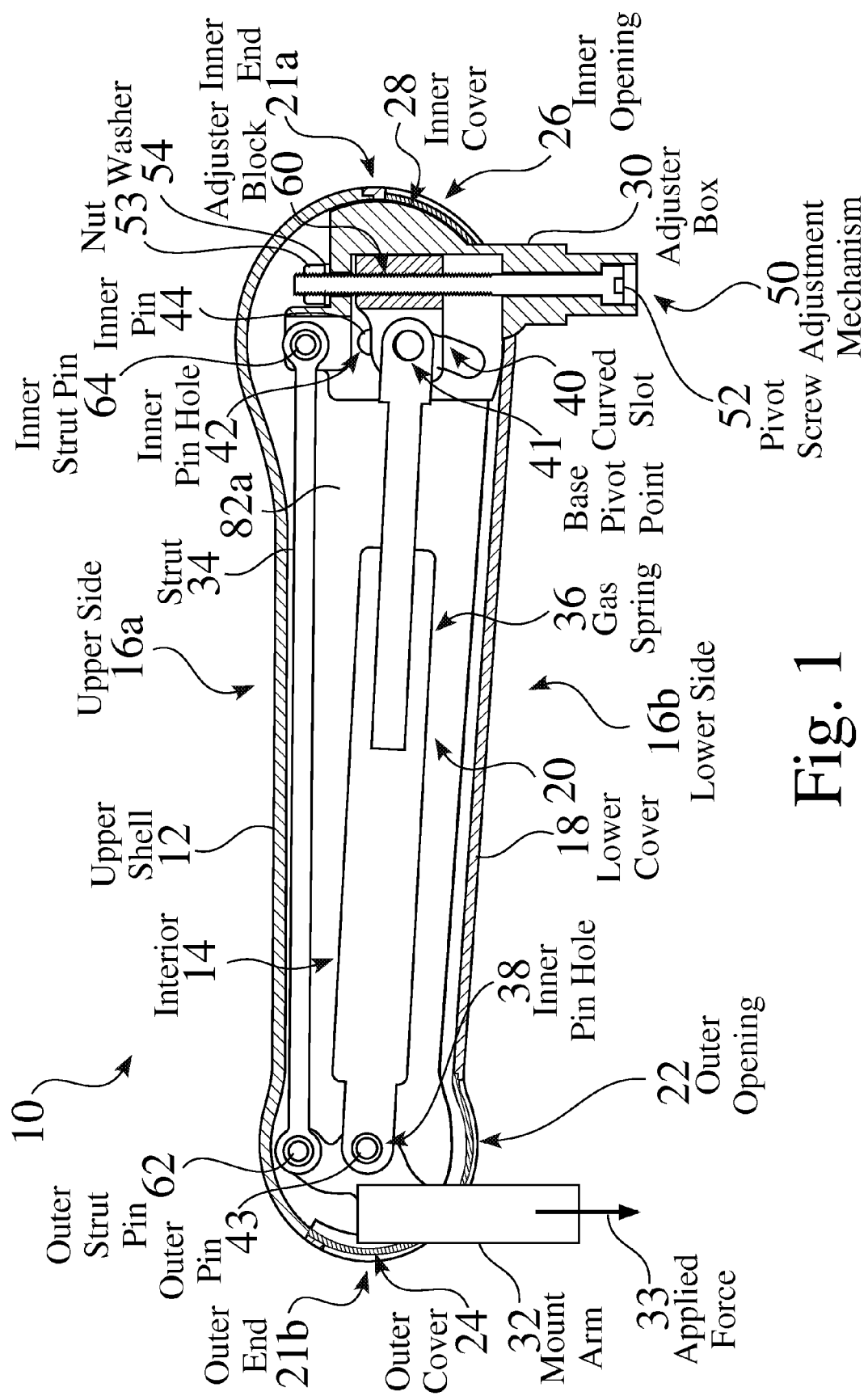
FIG. 1 is a partial side cutaway view of an exemplary enhanced variable height arm.
Figure 2:
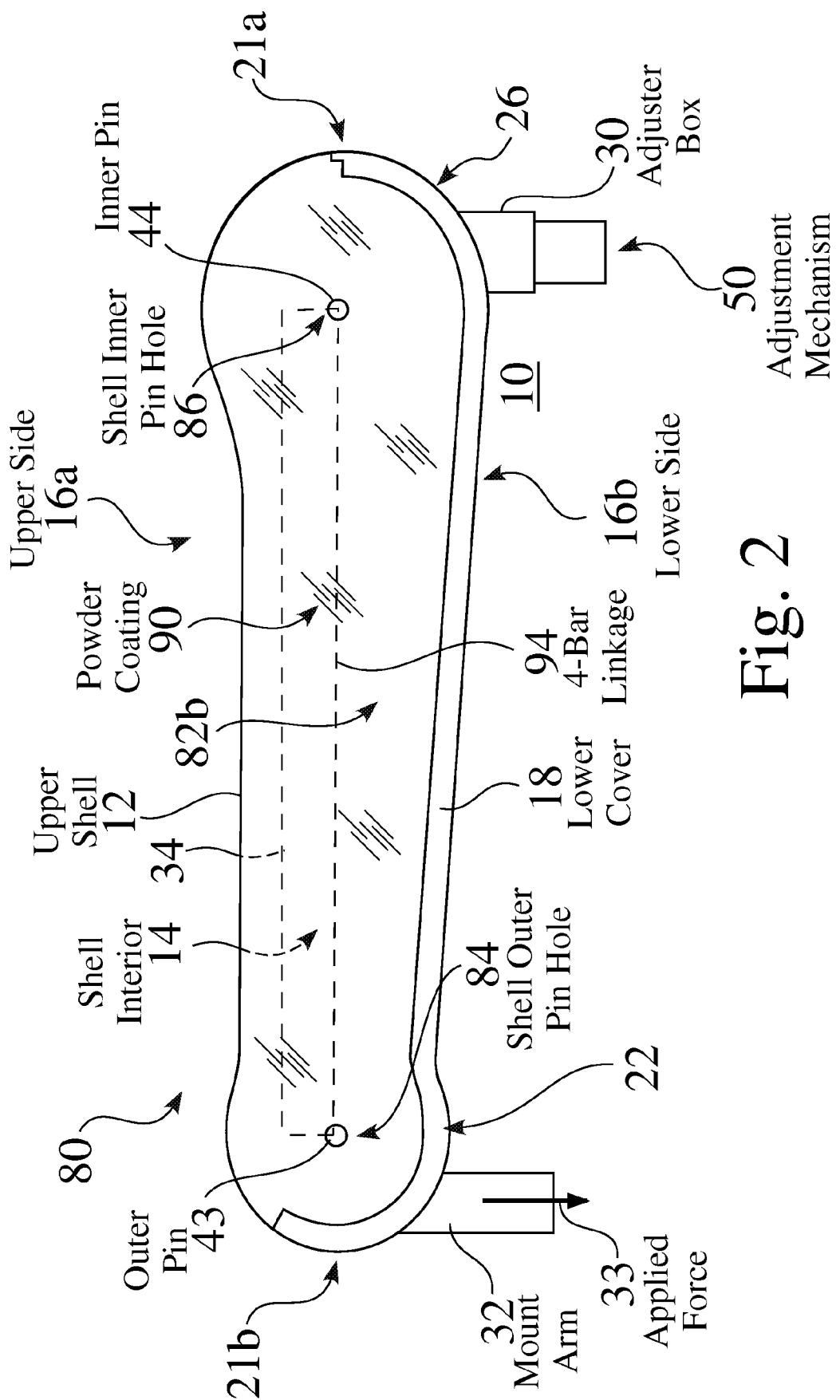
FIG. 2 is a side view of an exemplary enhanced variable height arm.
Figure 3:
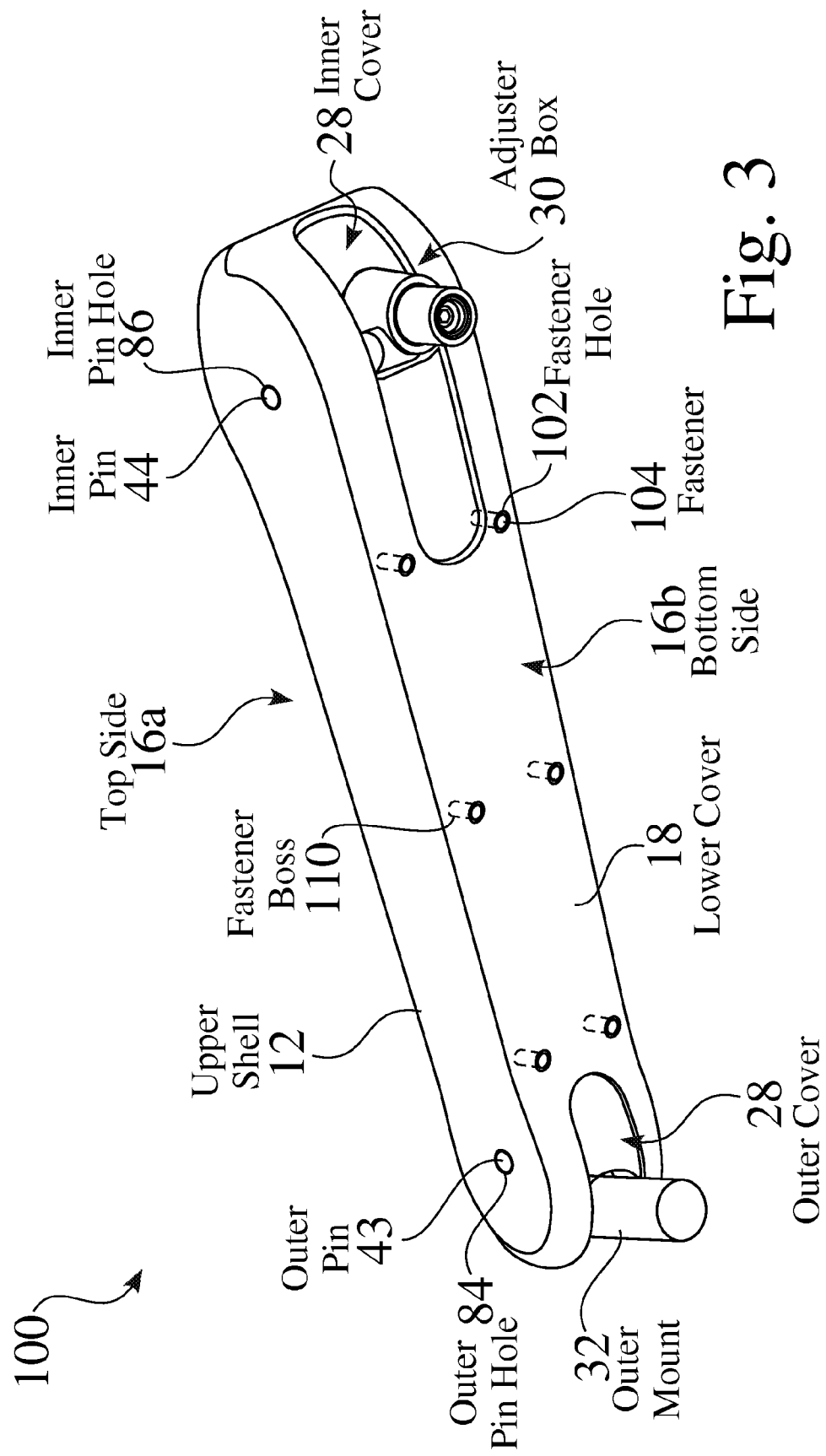
FIG. 3 is a lower perspective view of an exemplary enhanced variable height arm.
Figure 10:
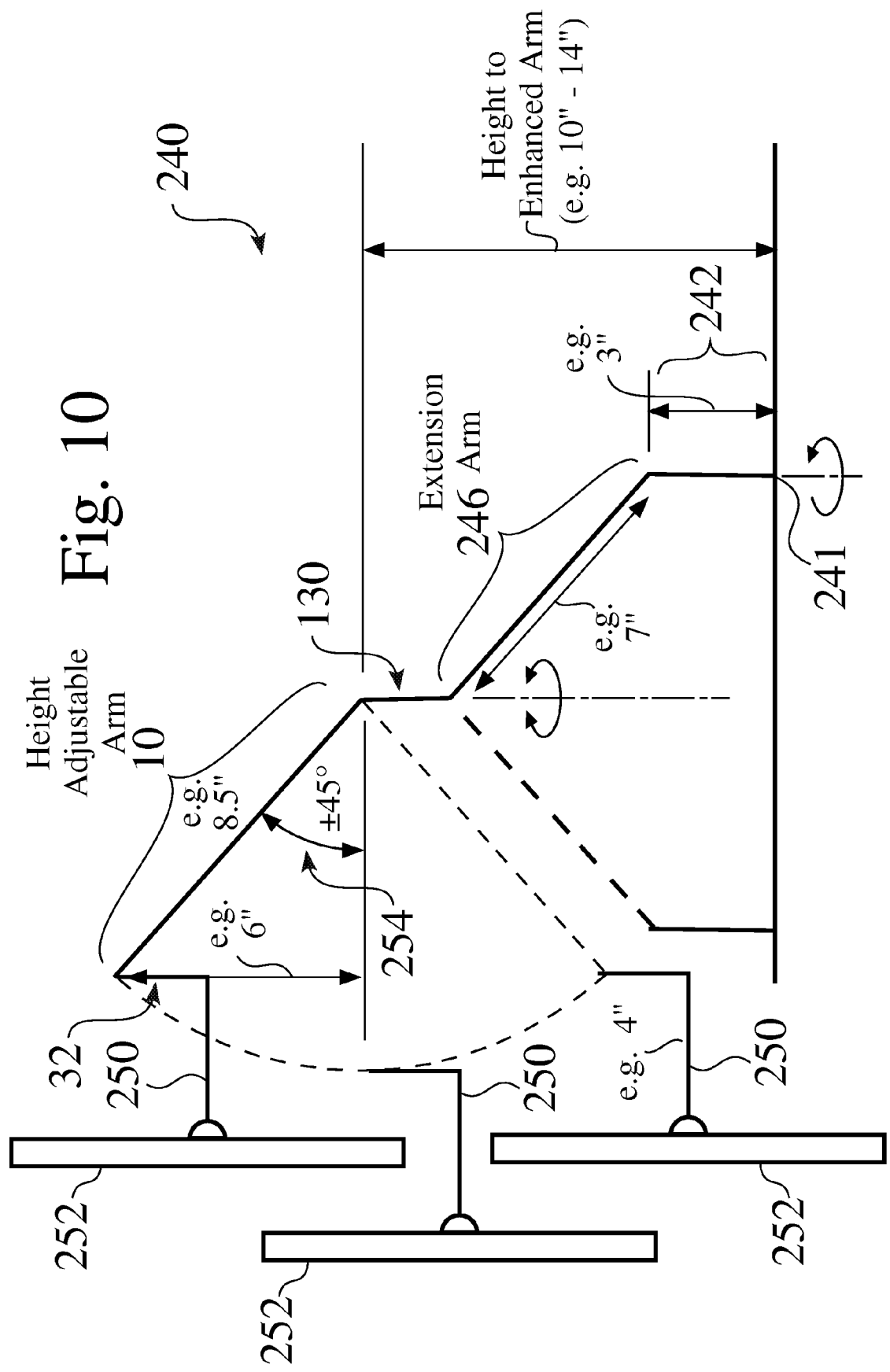
FIG. 10 shows geometry associated with an exemplary enhanced variable height arm and an associated mounting system.

FIG. 1 is a partial side cutaway view of an exemplary enhanced variable height arm 10, which may preferably comprise a gas spring counter☐balanced height adjustable arm 10. FIG. 2 is a side view 80 of an exemplary enhanced variable height arm 10. FIG. 3 is a lower perspective view 100 of an exemplary enhanced variable height arm 10. The exemplary enhanced variable height arm 10 seen in FIG. 2 and FIG. 3 may preferably comprise an outer structure 12 that prevents contamination and allows cleanability, such as for installation within a hospital environment. The enhanced variable height arm 10 is typically configured for and implemented within an arm system 300, e.g. 300a (FIG. 14), such as for but not limited to support for a monitor 252 (FIG. 10).

As seen in FIG. 1, an enhanced arm strut structure 20 extends from a first inner end 21a toward a second outer end 21b, between an adjuster box 30 and a mount arm 32. The mount arm 32 is suspended from the adjuster box 30 by a strut 34 and an upper shell 12, which are both pivotably connected between the adjuster box 30 and the mount arm 32. The strut 34 is pivotably connected to the mount arm 32, such as by an outer strut pin or fastener 62, and pivotably connected to the adjust box 30, such as by an inner strut pin or fastener 64. The adjuster box 30 is pivotably connected to the upper shell 12 by one or more inner pins 44, while the mount arm 32 is pivotably connected to the upper shell 12 by one or more outer pins 43. A bias element 36, such as but not limited to a gas spring 36, is also attached between the adjuster box 30 and the mount arm 32, and is adjustable within a plurality of positions 150, e.g. 150a-150k (FIG. 5) with respect to the adjuster box 30.

As seen in FIG. 2, the structure of the upper shell 12, as connected between the outer pin 43 and the inner pin 44, in combination with the mount arm 32, the adjuster box 30, and the strut 34, define and operate as a parallel, i.e. a 4-bar, linkage 94, wherein the front of the mount arm 32 may preferably maintain its angle through the range of motion. In some embodiments of the enhanced variable height arm 10, the front of the mount arm 32 remains square, e.g. coplanar with respect to a horizontal plane, or vertical with respect to an applied force 33, such as within +1 degree up to 0 degrees down, under a full range of loads and orientations.

The exemplary bias element 36 seen in FIG. 1 comprises a gas spring strut 36, such as available through Stabilus, Inc., of Colmar, Pa. For example, one current embodiment of the bias element 36 comprises a gas spring strut having an overall length of 9.72 inches, having a specified stroke of 85 mm, and a maximum applied force of 1,000 Newtons. While the exemplary bias element 36 seen in FIG. 1 comprises a gas spring strut 36, other bias elements 36 may alternately be used, such as but not limited to a coil spring struts 36, and may further comprise a damping element, such as but not limited to any of air damping, oil damping, elastomeric damping, or any combination thereof.

Figure 5:
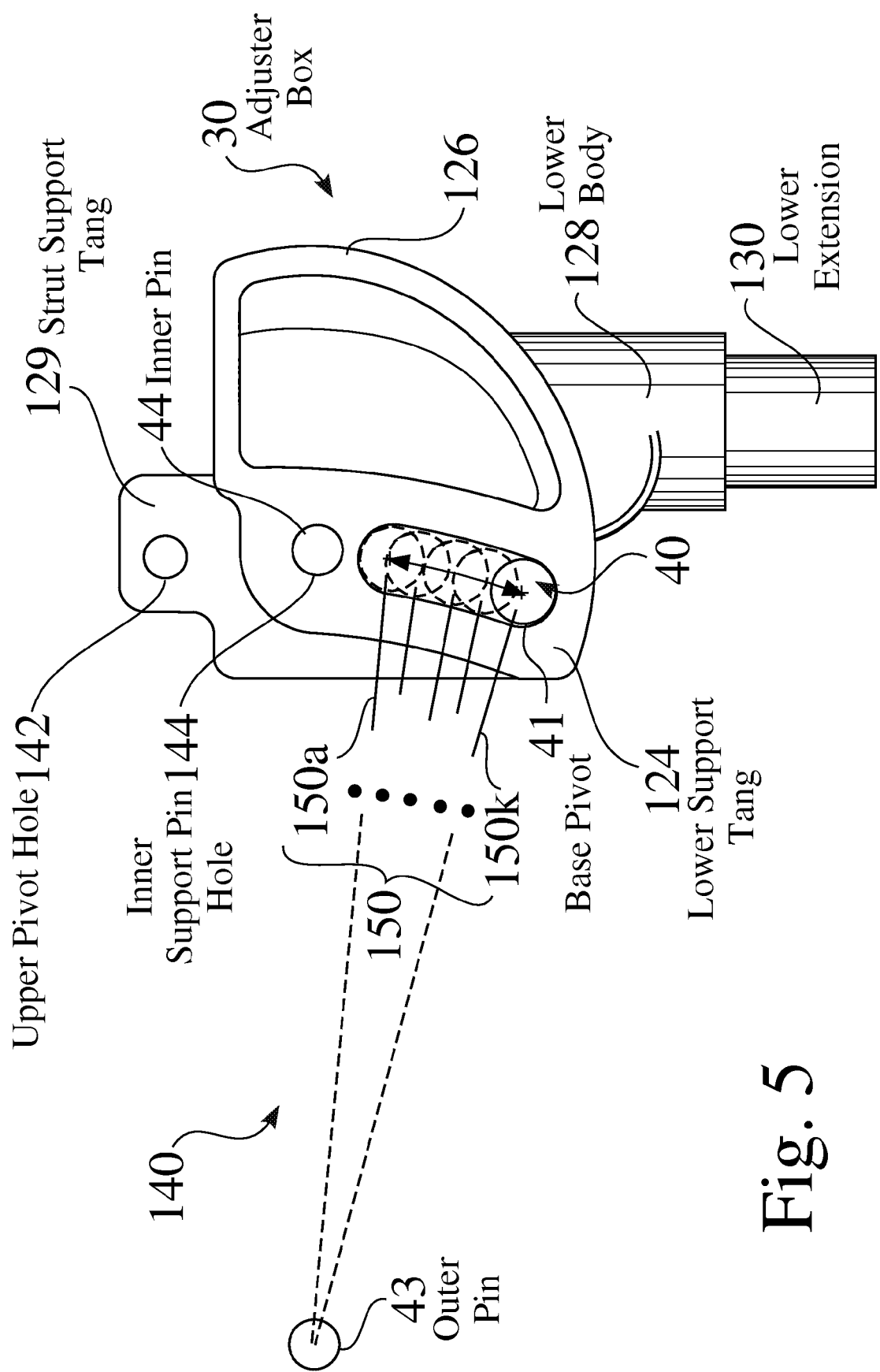
FIG. 5 is a detailed side view of an exemplary adjuster box.

The mount arm 32 is typically connected to an external load, e.g. a monitor 252, wherein an applied force 33 is applied through the mount arm 32 to the arm strut structure 20. The arm strut structure 20 seen in FIG. 1 also comprises a pivot adjustment mechanism 50, wherein the location of the base pivot point 41 of the gas spring 36 is adjustable 406 (FIG. 17) along a curved slot 40, such as defined through the adjuster box 30, to controllably counterbalance across the full range of motion for the variable height arm 10 and an attached external load 252 (FIG. 10) in one or more desired positions 150 (FIG. 5).

The pivot adjustment mechanism 50 seen in FIG. 1 and FIG. 2 is accessible from the lower side 16b of the enhanced variable height arm 10, since the adjuster box 30 extends through the inner cover opening 26 of the enhanced variable height arm 10, and provides access to a pivot adjustment screw 52. Therefore, the exemplary enhanced variable height arm 10 seen in FIG. 1 and FIG. 2 does not require a separate cover, such as through the side, top, or rear of the inner end 21a of the enhanced variable height arm 10.

The adjuster block 60 is threadably engaged to a pivot adjustment screw 52 having threads 140 (FIG. 4), wherein the pivot adjustment screw 52 extends through the adjuster box 30, and is adjustable 174 (FIG. 6), such as by a tool 170 (FIG. 6), wherein the tool 170 may preferably comprise any of a socket, hex key, screwdriver, or other driver, e.g. a Tort driver.

Embodiments of the enhanced variable height arm 10 may preferably be specified within a desired weight range, e.g. such as but not limited to attached monitors or screens 252 having a weight of 5 to 20 pounds, wherein the gas spring 36 is adjustable 406 along the curved slot 40, to controllably counterbalance the variable height arm 10 and attached external load 310 over the specified weight range.

The exemplary enhanced variable height arm 10 seen in FIG. 1 and FIG. 2 is substantially enclosed by the upper shell 12, wherein the upper shell 12 extends from the inner end 21a to the outer end 21b, and comprises opposing sides 82a,82b that extend downward from the upper side 16a toward the lower side 16b, such that an interior region 14 is defined within.

In the exemplary enhanced variable height arm 10 seen in FIG. 1 and FIG. 2, each of the opposing sides 82a,82b of the upper shell 12 include an outer pin hole 84 and an inner pin hole 86 defined there through, wherein the adjuster box 30 and the mount arm 32 are rotatably affixed within the interior 14 of the shell 12. For example, opposing outer pins 43 are typically pressable though the outer pin holes 84 and into corresponding inner pin holes 38 in the mount arm 32. Similarly, opposing inner pins 44 are typically pressable though the inner pin holes 86 and into corresponding inner holes 42 in the adjuster box 30.

The exemplary enhanced variable height arm 10 seen in FIG. 1 and FIG. 2 is further substantially enclosed by a lower cover 18, which extends across the bottom side 16b of the arm 10 from the inner end 21a to the outer end 21b. In the exemplary enhanced variable height arm 10 seen in FIG. 1, FIG. 2, and FIG. 3, the lower cover 18 may preferably comprise one or more fastener holes 102, wherein fasteners 104 may typically be used to attach the lower cover 18 to the upper cover 12, e.g. into fastener bosses 110 (FIG. 3) defined in the upper shell 12.

While the enhanced variable height arm 10 seen in FIG. 1, FIG. 2, and FIG. 3 shows exemplary fasteners 104 for connecting the opposing shells 12,18 to each other, other embodiments may alternately provide other means for attachment, such as hidden snaps, latches, detents, ridges, or other retainers, such as for any of reducing manufacturing cost, improving assembly quality, reducing contamination during use, and/or improving cleanability for the enhanced variable height arm 10.

The exemplary lower cover 18 seen in FIG. 1 and FIG. 3 further comprises an inner opening 26 associated with the adjuster box 30, and an outer opening 22 associated with the mount arm 32. An outer cover 24 provides coverage within the outer opening 22 surrounding the mount arm 32, while an inner cover 28 provides coverage within the inner opening 26 surrounding the extended portions 128,130 (FIG. 4) of the adjuster box 30.

As seen in FIG. 2 and FIG. 3, the enhanced variable height arm 10 may preferably comprise an outer structure that prevents contamination and allows cleanability, such as in a hospital environment. For example, as seen in FIG. 2 and FIG. 3, the upper shell 12, the lower cover 18, the outer cover 24 and the inner cover 28 are clean, smooth, and well enclosed, wherein the moving components exit the bottom 16*b* through the covers 24,28.

In the exemplary enhanced variable height arm 10 seen in FIG. 2 and FIG. 3, no fasteners, e.g. 104, are visible on the top 16*a* or side 82*a*,82*b* exposed surfaces. The outer pin 43 and inner pins 44, which typically extend through the outer pin holes 84 and inner pin holes 86 respectively, may preferably comprise stainless steel, having substantially flat outer surfaces that are flush to the sides of the upper shell 12, such as to be readily cleaned. In alternate embodiments of the enhanced variable height arm 10, the outer pin 43 and inner pins 44 may preferably be retained within the interior 14 of the upper shell 12, without the need for outer pin holes 84 and inner pin holes 86.

In some embodiments, the upper shell 12 is comprises a die cast aluminum body, such as for strength and stiffness, and may further comprise a smooth powder coating 90 (FIG. 2), such as to provide a durable aesthetic finish. The powder coating finish 90 may preferably further comprise an antimicrobial additive, e.g. such as but not limited to Alesta® AM powder coatings 90, available through DuPont de Nemours & Co., of Wilmington Del. The top and sides of the upper shell 12 may preferably comprise a continuous smooth metal surface, such as with no fasteners or plastic covers, and may preferably be free of any gaps, ridges, tight corners or heavy textures that would make cleaning difficult.

In some embodiments, the lower cover 18 and shield covers 24,28 may preferably comprise injection molded plastic, such as to provide each of the unique contours and shield guide track features. The lower cover 18, shield covers 24,28, and/or other components that comprise plastics, may preferably comprise polymers that are resistant to any of water, cleaners, disinfectants, and/or other chemicals and solutions. For example, some embodiments of the lower cover 18, shield covers 24,28, and/or other components associated with the enhanced variable height arm 10 may comprise polymers, such as but not limited to any of polypropylene (PP) or polyethylene (PE), and may further comprise one or more additives, such as but not limited to any of an antimicrobial additive or an additive to prevent ultraviolet (UV) degradation. The chemical compatibility of components may preferably be performed, such as for any of:

ASTM D543-6 standards;
determination of loss of mechanical strength; and/or
inspection for any of cracking or crazing that may reduce surface cleanability.

The outer cover shield 24 and the inner cover shield 28 may preferably comprise slidable and flexible elements, such as to substantially seal the outer cover opening 22 and the inner cover opening 26, e.g. for different adjustable positions of the mount arm 32 and the adjuster box 30. The cover shields 24,28 may preferably be track guided with respect to the lower cover 18, such as by being constrained, e.g. for smooth quiet operation, within channels associated with the lower cover 18.

Figure 4:
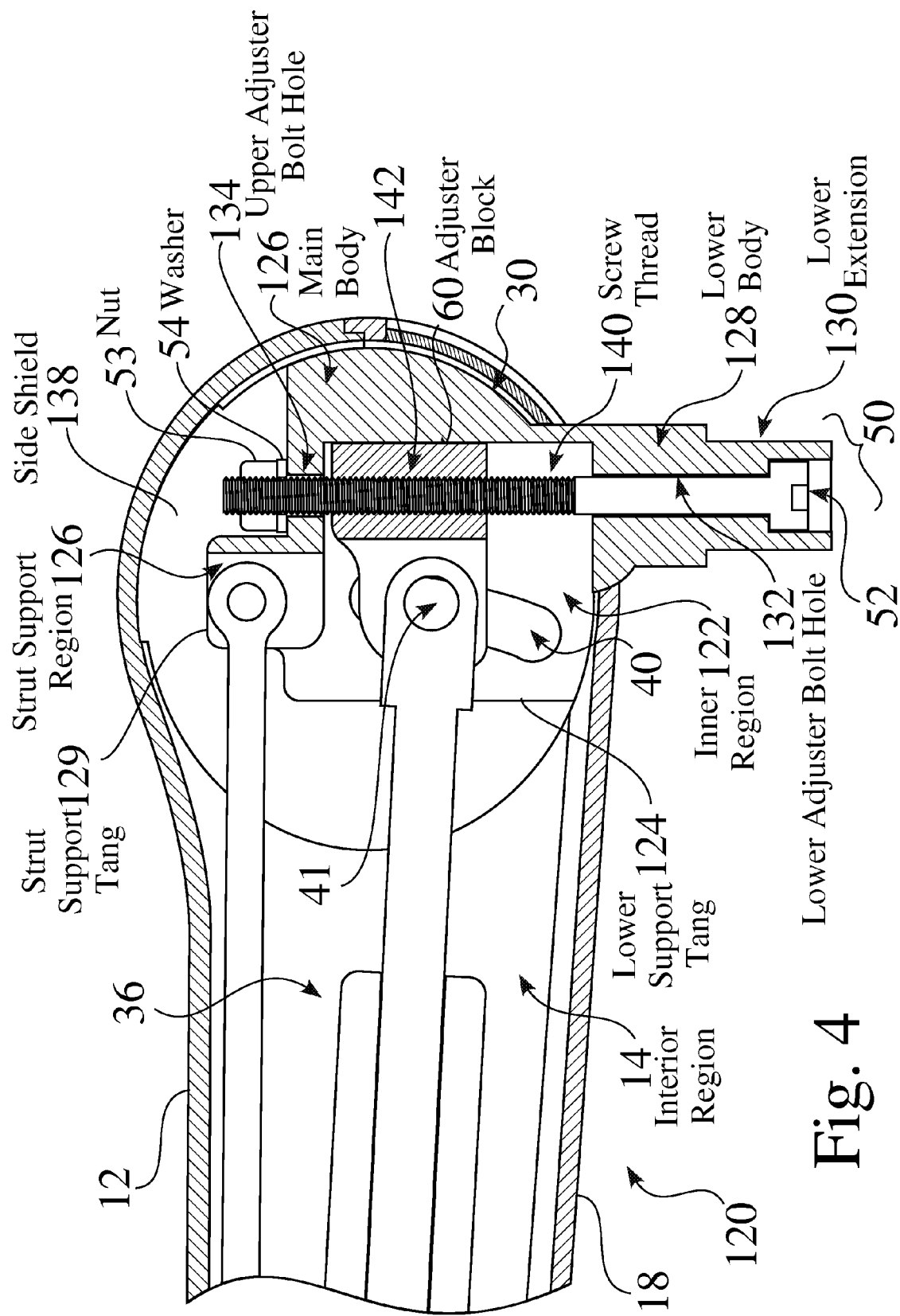
FIG. 4 is a partial side cutaway view of a portion of an exemplary enhanced variable height arm.
Figure 6:
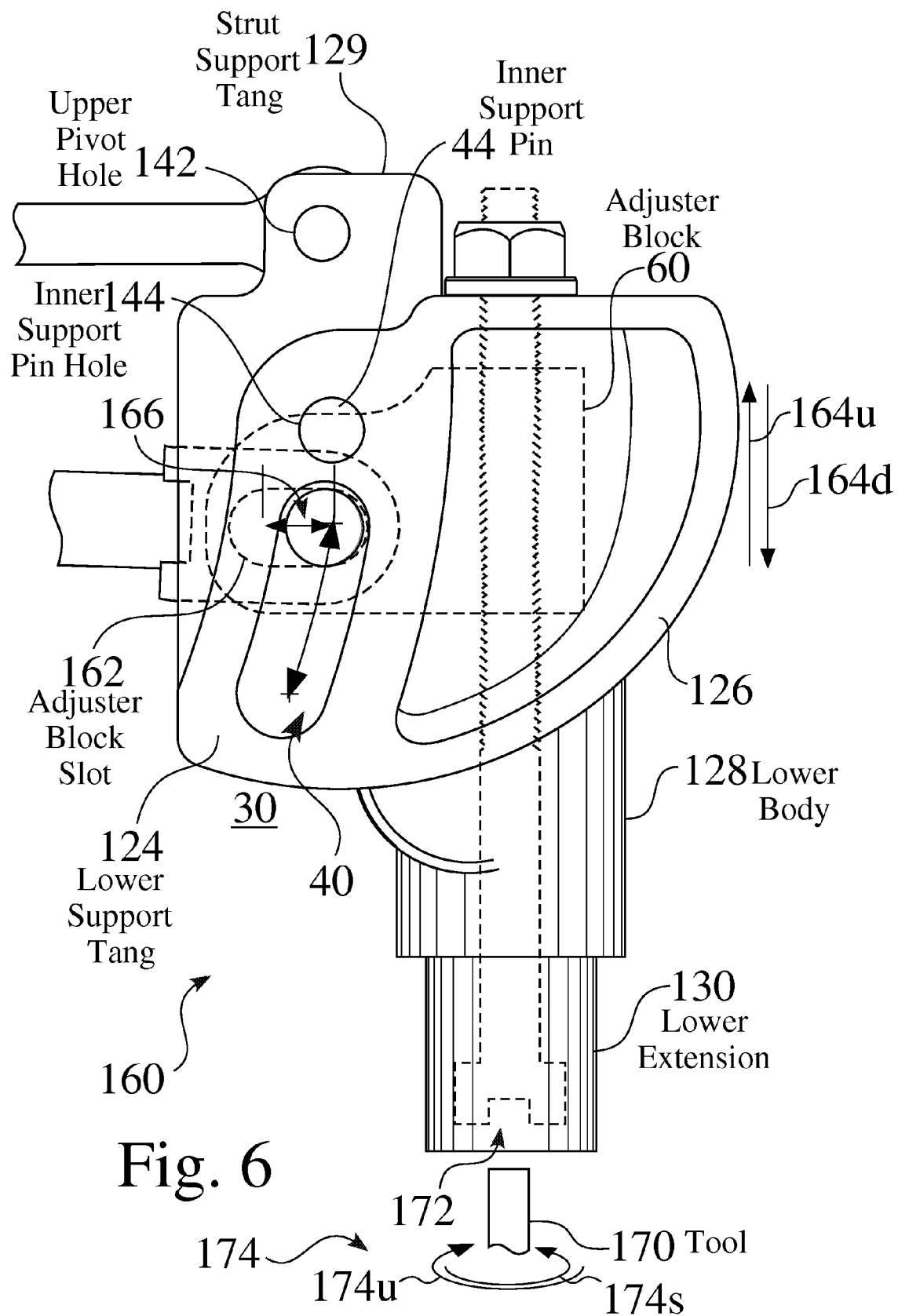
FIG. 6 is a partial assembly view of an adjuster box and adjuster block of an exemplary enhanced variable height arm.

FIG. 4 is a partial side cutaway view 120 of a portion of an exemplary enhanced variable height arm 10. FIG. 5 is a detailed side view 140 of an exemplary adjuster box 30. FIG. 6 is a partial assembly view 160 of an adjuster box 30 and adjuster block 60 for an exemplary enhanced variable height arm 10.

As seen in FIG. 4, a pivot point 41 at the base of gas spring 36 is adjustably constrained within a curved slot 40, such as to adjustably provide counterbalancing for different weights and/or different positions, e.g. such as for but not limited to support for a monitor, display screen or other device 252 (FIG. 10). While some prior art systems have linear adjustment between a plurality of positions for a bias element, such systems fail to provide adequate adjustability of counterbalancing for different loads, i.e. an applied force 33. In contrast, the enhanced variable height arm structure 10 provides a non-linear or curved path 40 for the bias element 36, which can compensate for any of different loads 33, system geometry, spring progressivity, or any combination thereof, in a way that a linear path cannot provide.

Figure 14:
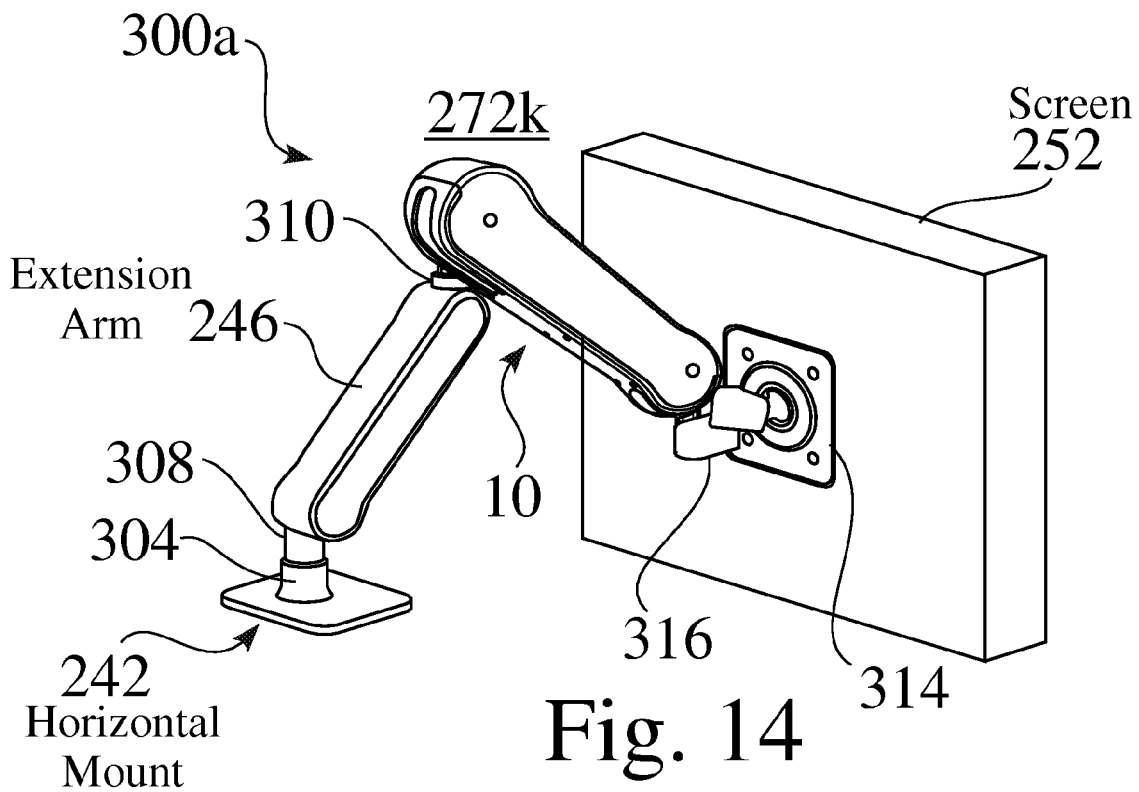
FIG. 14 is a perspective view of a mounting structure having an exemplary enhanced variable height arm in a generally downward position.

The exemplary adjuster box 30 seen in FIG. 4 comprises a main body 126, a lower body 128 that extends from the main body 126, and a lower extension 130 that extends further from the lower body 128, such as to provide means for connection to an extension arm 246 (FIG. 10, FIG. 14). As also seen in FIG. 4, one or more side shields 138 may be located on opposite sides of the main body 126 of the adjuster box 30 within the interior region 14 of the upper shell 12.

One or more strut support tangs 129 extend from the main body 126, and have upper pivot holes defined therethrough, through which an inner strut pin 64 is pivotably attached to the strut 34. A plurality of lower support tangs 124 extend from the main body 126, wherein a central hollow arc support region 122 may be defined there between. One or more curved, non-linear, arcuate, or radial arc slots 40 are also defined through the main body 126, such as comprising a pair of opposing slots 40 defined through opposing lower support tangs 124.

The exemplary adjuster box 30 seen in FIG. 4 comprises a pivot adjustment mechanism 50, wherein the position 150 of the bias element 36 may controllably be adjusted 174 (FIG. 6). For example, an adjuster block 60, having a threaded hole 142, is located within the central hollow arc support region 122. As seen in FIG. 6, the adjuster block 60 also comprises an adjuster block slot 162 defined therethrough, which may preferably comprise a linear slot 162, e.g. such as horizontal or inclined.

The adjuster block 60 is threadably engageable to an adjustment screw 52 having threads 140, which extends through the adjuster box 30, and is adjustable 174, such as by a tool 170 (FIG. 6), wherein the tool may preferably comprise any of a socket, hex key, screwdriver, or other driver, e.g. a Torx® driver. The internal counterbalance of the enhanced variable height arm 10 may therefore be adjusted, so that the load may be moved with minimal force by the end user. In some embodiments of the enhanced variable height arm 10, the bias element 36 comprises a gas spring 36, which provides smooth motion and a flatter spring rate. In one current embodiment of the arm 10, the maximum force required to move a mounted device 252 is about 5 lbf. up or down, with no drift or unwanted movement when under small loads, such as when typing and touching the screen.

Rotation 174 of the adjustment screw 52 results in vertical movement of the adjuster block 60. For example, tightening 174s of the adjustment screw 52 results in downward movement 164d (FIG. 6) of the adjuster block 60, wherein the base pivot 41 moves generally downward between positions 150 within the curved slot 40, and generally forward, i.e. away from the screw 152, to an intersecting position 166 of the adjuster block slot 162. Similarly, loosening 174u of the adjustment screw 52 results in upward movement 164u (FIG. 6) of the adjuster block 60, wherein the base pivot 41 moves generally upward between positions 150 within the curved slot 40, and generally backward, i.e. toward the screw 152, to an intersecting position 166 of the adjuster block slot 162.

The enhanced variable height arm 10 is therefore readily adjustable, such as before or after installation within a mount structure 300, e.g. 300a (FIG. 14). For example, an enhanced variable height arm 10 may be:
 pre-adjusted, such as based on a preselected load;
 adjusted during or after installation; and/or
 readjusted, such as for any of fine tuning adjustment, changing an attached load, or adjusting to compensate for any of age or wear.

Figure 7:
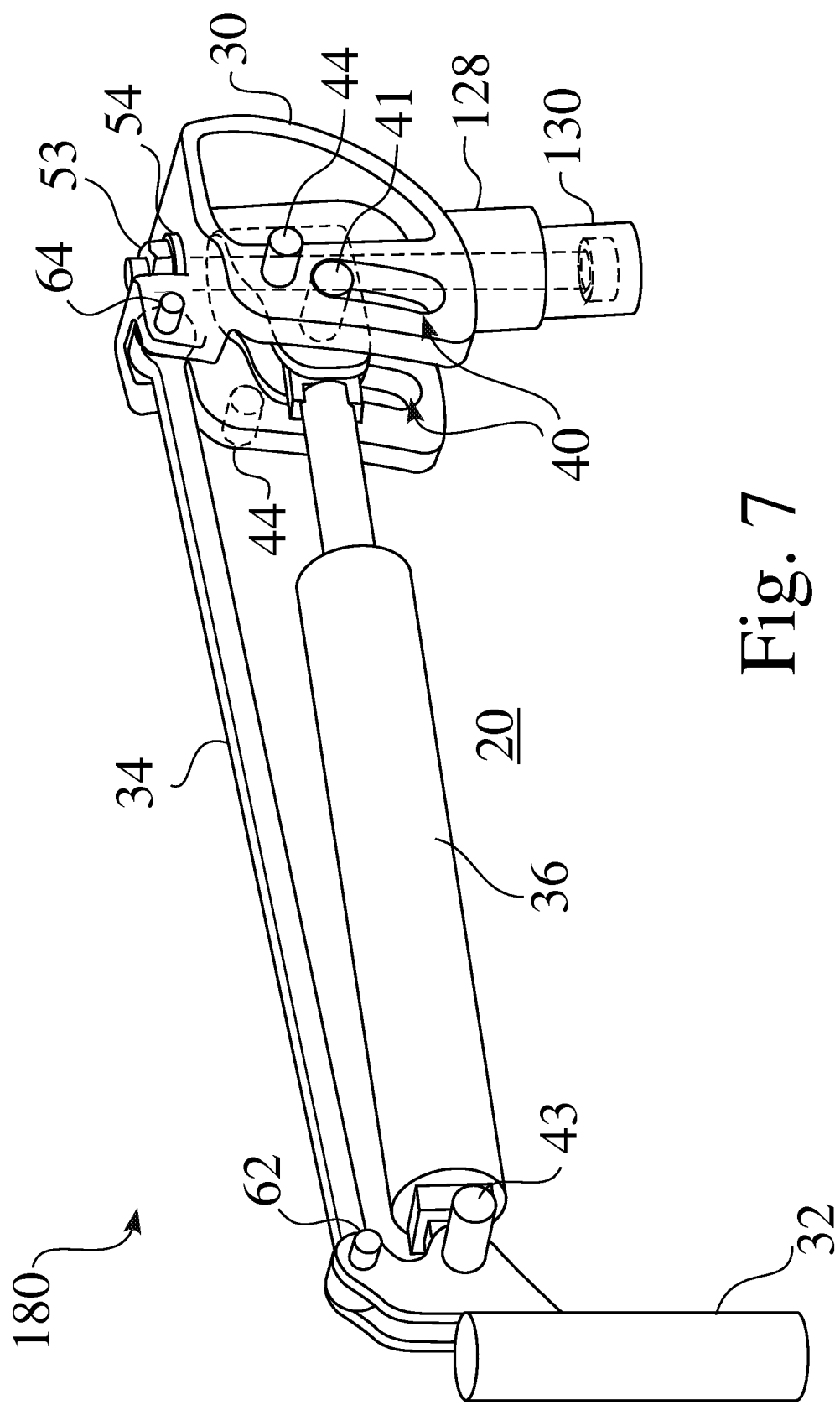
FIG. 7 is a perspective view of a structural assembly associated with an exemplary enhanced variable height arm.
Figure 8:
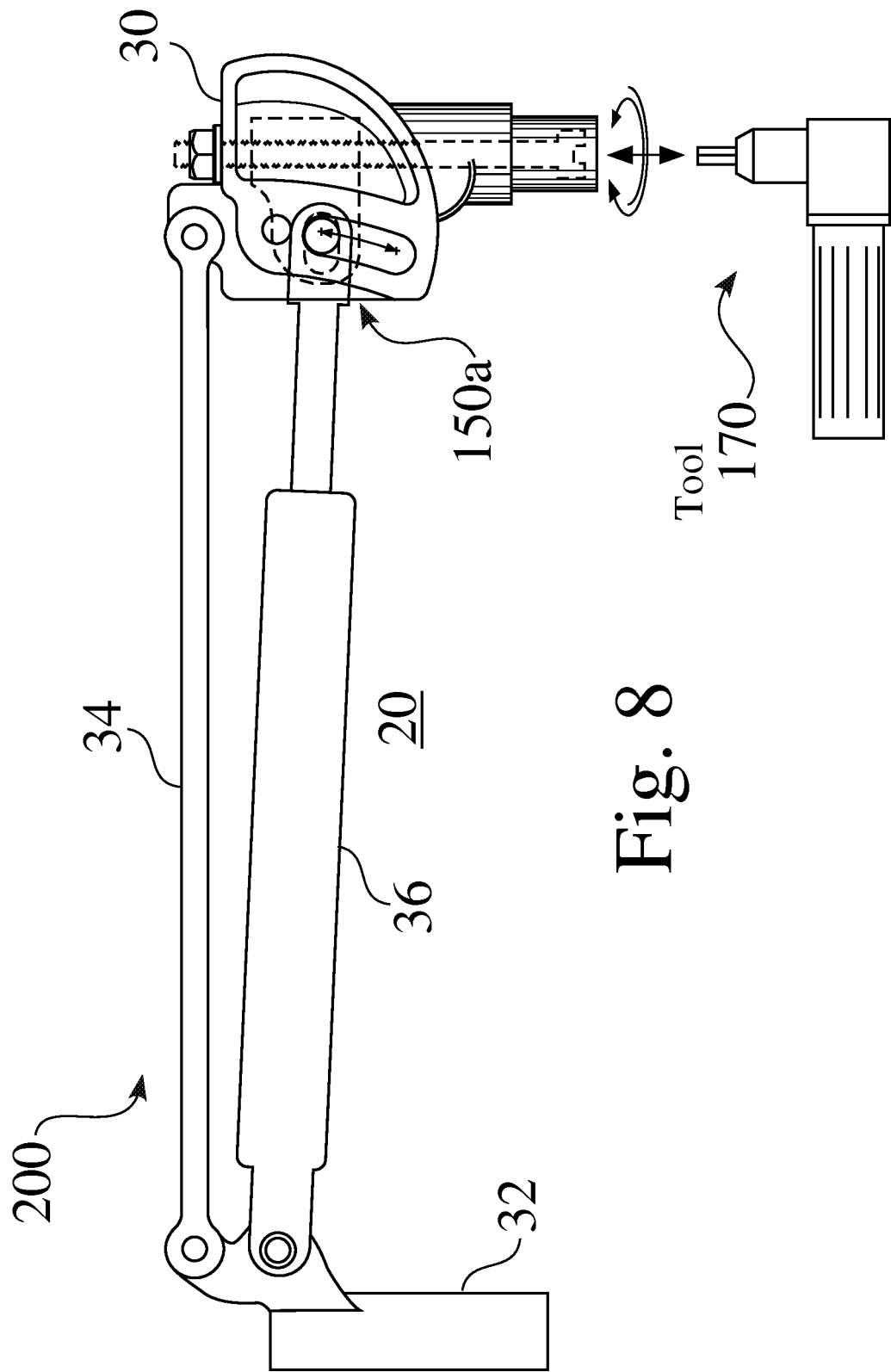
FIG. 8 is a side view of a structural assembly associated with an exemplary enhanced variable height arm, wherein the adjustor block is located in a first position in relation to an adjuster box.
Figure 9:
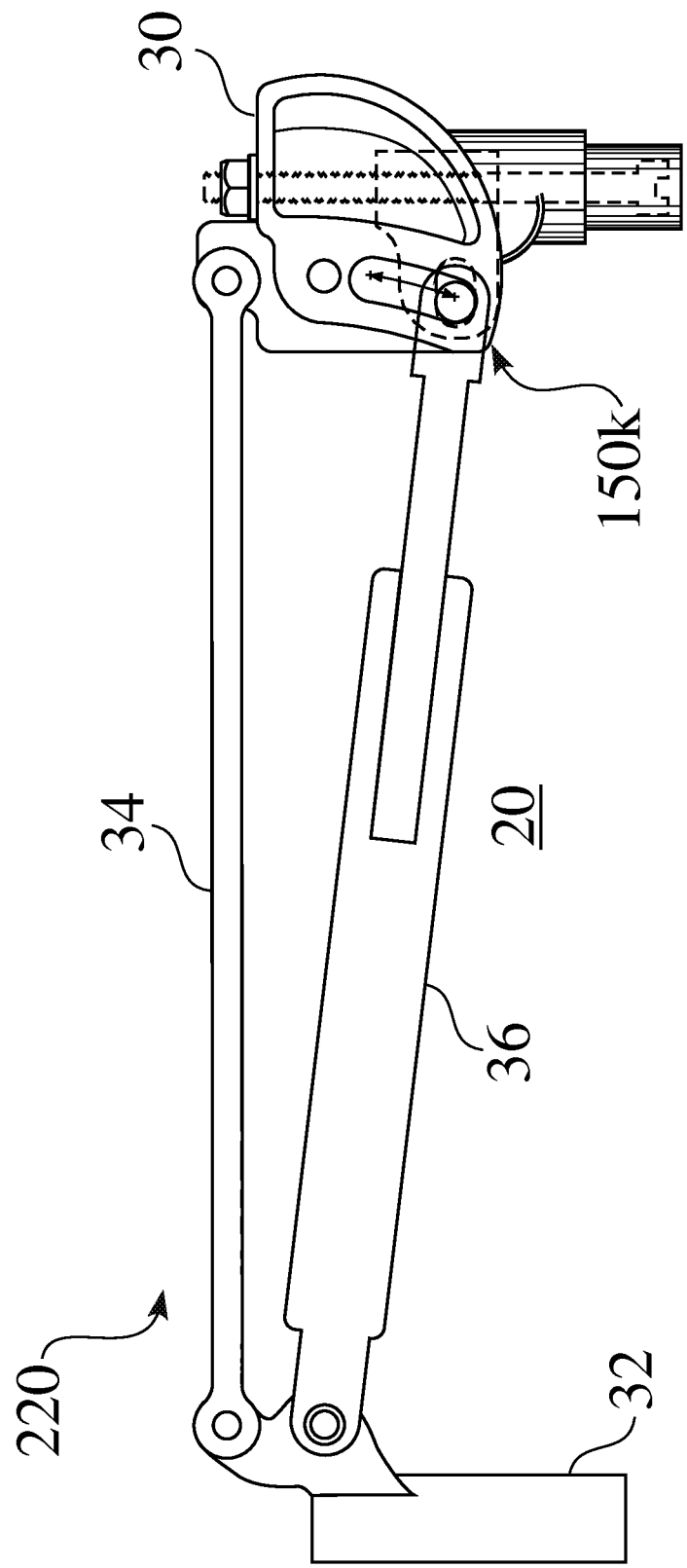
FIG. 9 is a side view of a structural assembly associated with an exemplary enhanced variable height arm, wherein the adjustor block is located in a second position in relation to an adjuster box.

FIG. 7 is a perspective view 180 of an arm strut structure assembly 20 associated with an exemplary enhanced variable height arm 10. FIG. 8 is a side view 200 of an arm strut structure assembly 20 associated with an exemplary enhanced variable height arm 10, wherein the gas spring base pivot 41 is located in a position 150, e.g. 150a, in relation to an adjuster box 30. FIG. 9 is a side view 220 of an arm strut structure assembly 20 associated with an exemplary enhanced variable height arm 10, wherein the gas spring pivot 41 is located in an alternate position 150, e.g. 150k, in relation to an adjuster box 30. As seen in FIG. 6 and FIG. 8, a tool 170 may readily be applied to adjust the mechanical advantage applied to the arm structure 20 by the bias element 36, by turning the adjuster screw 52, which moves 164, e.g. 164u, 164d, the adjuster block 60 parallel to the adjuster screw 52 due to the engagement of threads 140,142, and moves the base pivot 41 within the curved or non-linear slot 40, as well as within the adjuster block slot 162.

FIG. 10 shows geometry 240 associated with an exemplary enhanced variable height arm 10 within an exemplary mounting environment, such as within a mounting system 300, e.g. 300a (FIG. 14). For example, a lower extension arm 246 may be pivotably mounted to a lower mount 242. In the exemplary structure seen in FIG. 10, the variable height arm 10 is pivotably mounted to the extension arm 246, such as through the lower extension 130 of the adjuster box 30. As also seen in FIG. 10, a monitor 252 is mountable to the mount arm 32 of the enhanced variable height arm 10, such as through a monitor extension mount 250. The exemplary enhanced variable height arm 10 provides a plurality of positions, such as to control the incline angle 254 of the monitor 252. The exemplary enhanced variable height arm 10 shown schematically in FIG. 10 has a length of approximately 8.5 inches, and is adjustable upward and/or downward from horizontal, e.g. from about 45 degrees upward, yielding upward movement of about 6 inches above horizontal, to about 45 degrees downward, yielding downward movement of about 6 inches below horizontal. The exemplary structure seen in FIG. 10 provides an approximate clearance of about 4 inches between the mount surface of the attached monitor 252 and the center of the mount arm 32.

The first extension arm 246 typically comprises a solid arm having a fixed height and span. For example, FIG. 10 shows an exemplary fixed extension arm 246 having a span of about 7 inches, and a height of about 10 to 14 inches over a mount location, e.g. such as including a lower mount 242 having an exemplary height of about 3 inches.

Figure 11:
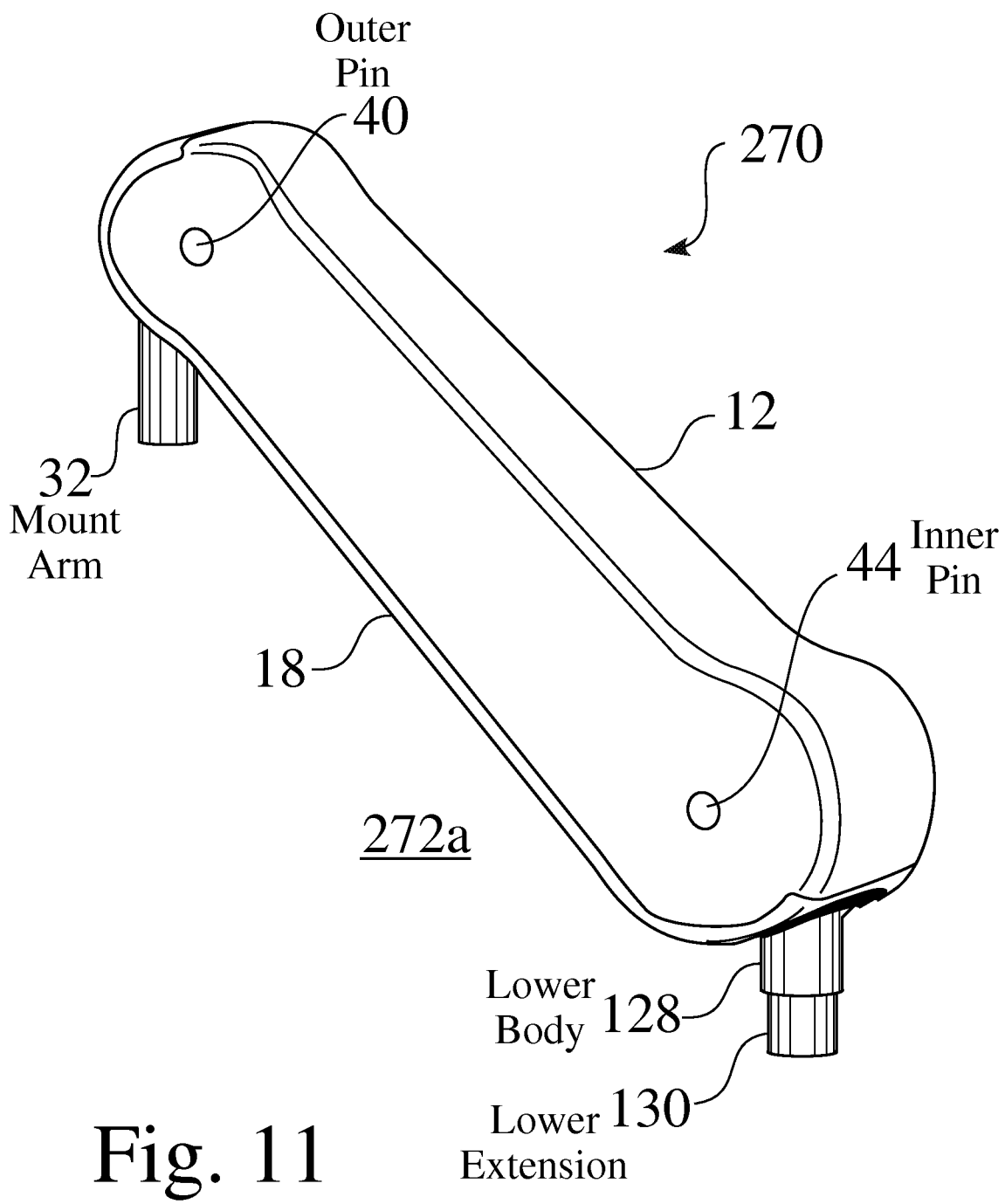
FIG. 11 is a perspective view of an exemplary enhanced variable height arm in a generally upward position.
Figure 12:
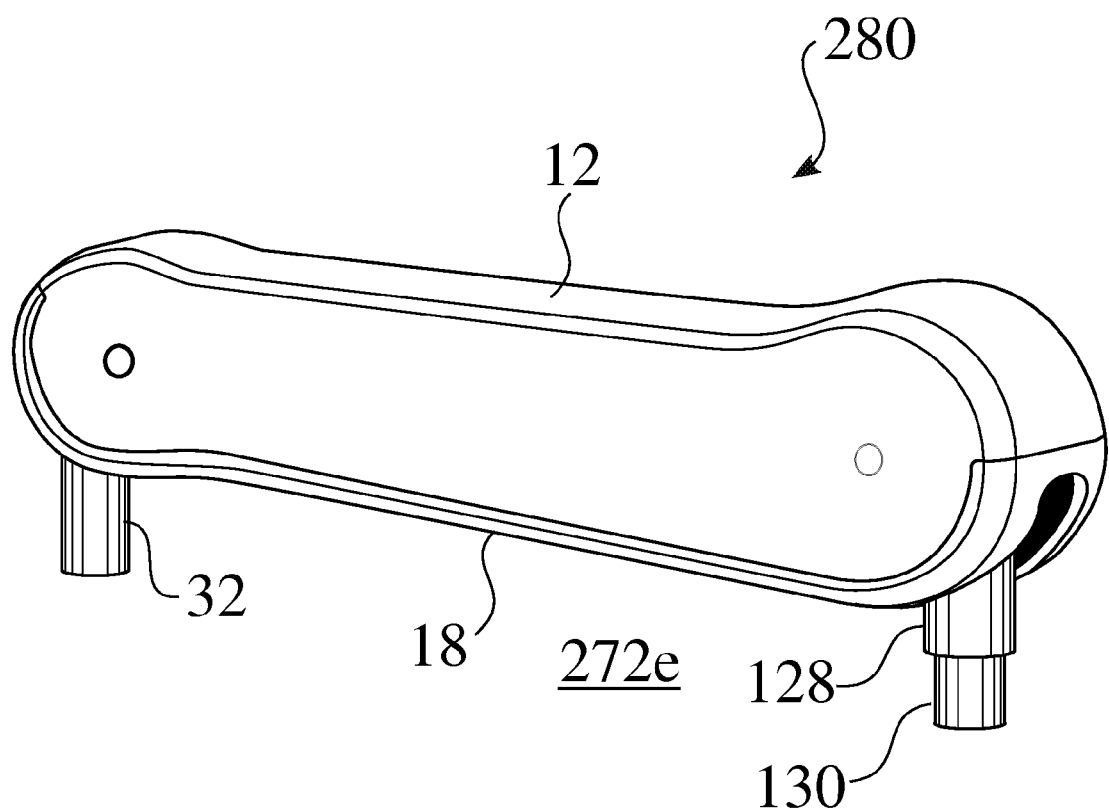
FIG. 12 is a perspective view of an exemplary enhanced variable height arm in a generally horizontal position.
Figure 13:
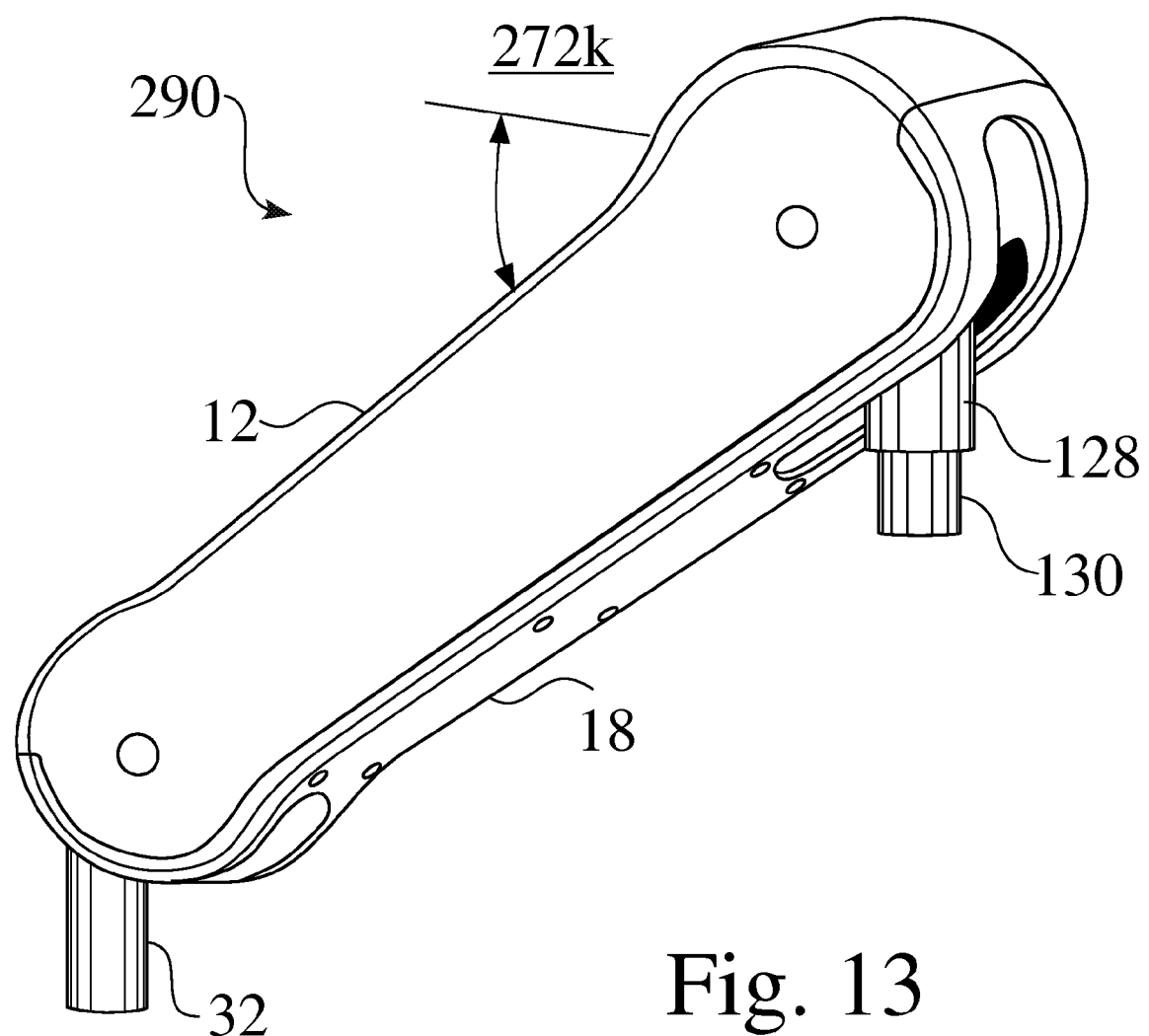
FIG. 13 is a perspective view of an exemplary enhanced variable height arm in a generally downward position.

FIG. 11 is a perspective view 270 of an exemplary enhanced variable height arm 10 in a generally upward position 272, e.g. 272a, based upon a position 150 defined by the base pivot 41 (FIG. 6). FIG. 12 is a perspective view 280 of an exemplary enhanced variable height arm 10 in a generally horizontal position 272, e.g. 272e. FIG. 13 is a perspective view 290 of an exemplary enhanced variable height arm 10 in a generally downward position 272, e.g. 272k.

Mounting Structures.

Figure 15:
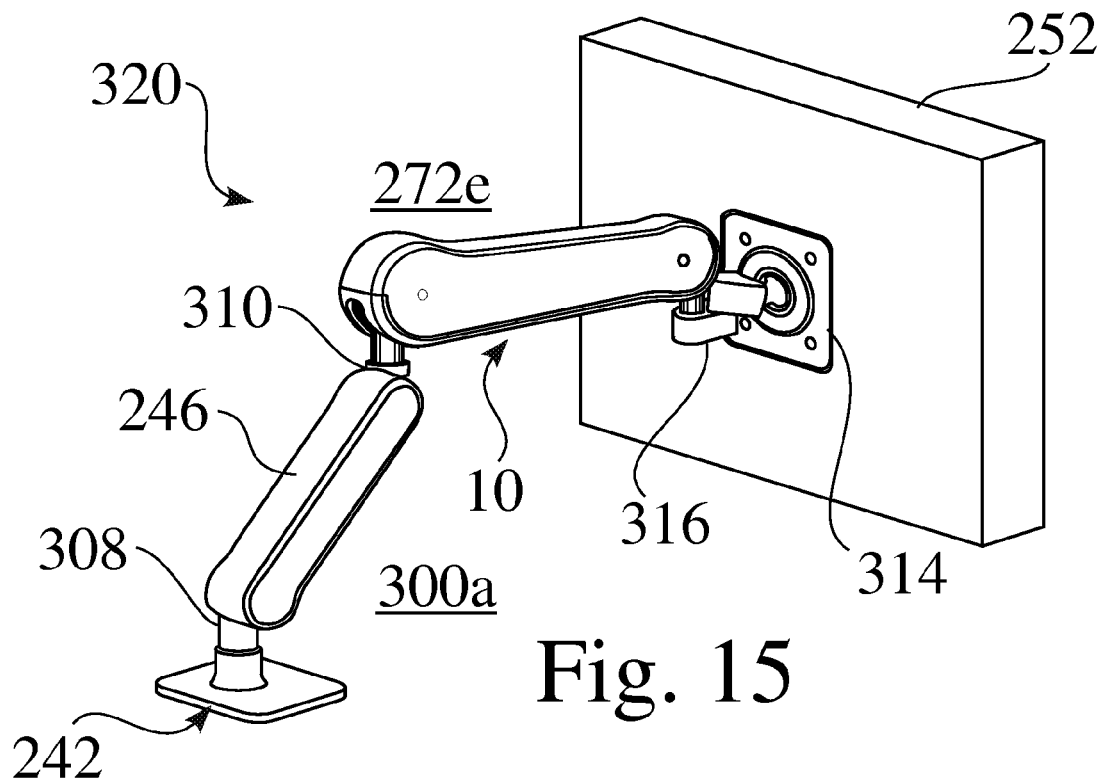
FIG. 15 is a perspective view of a mounting structure having an exemplary enhanced variable height arm in a generally horizontal position.
Figure 16:
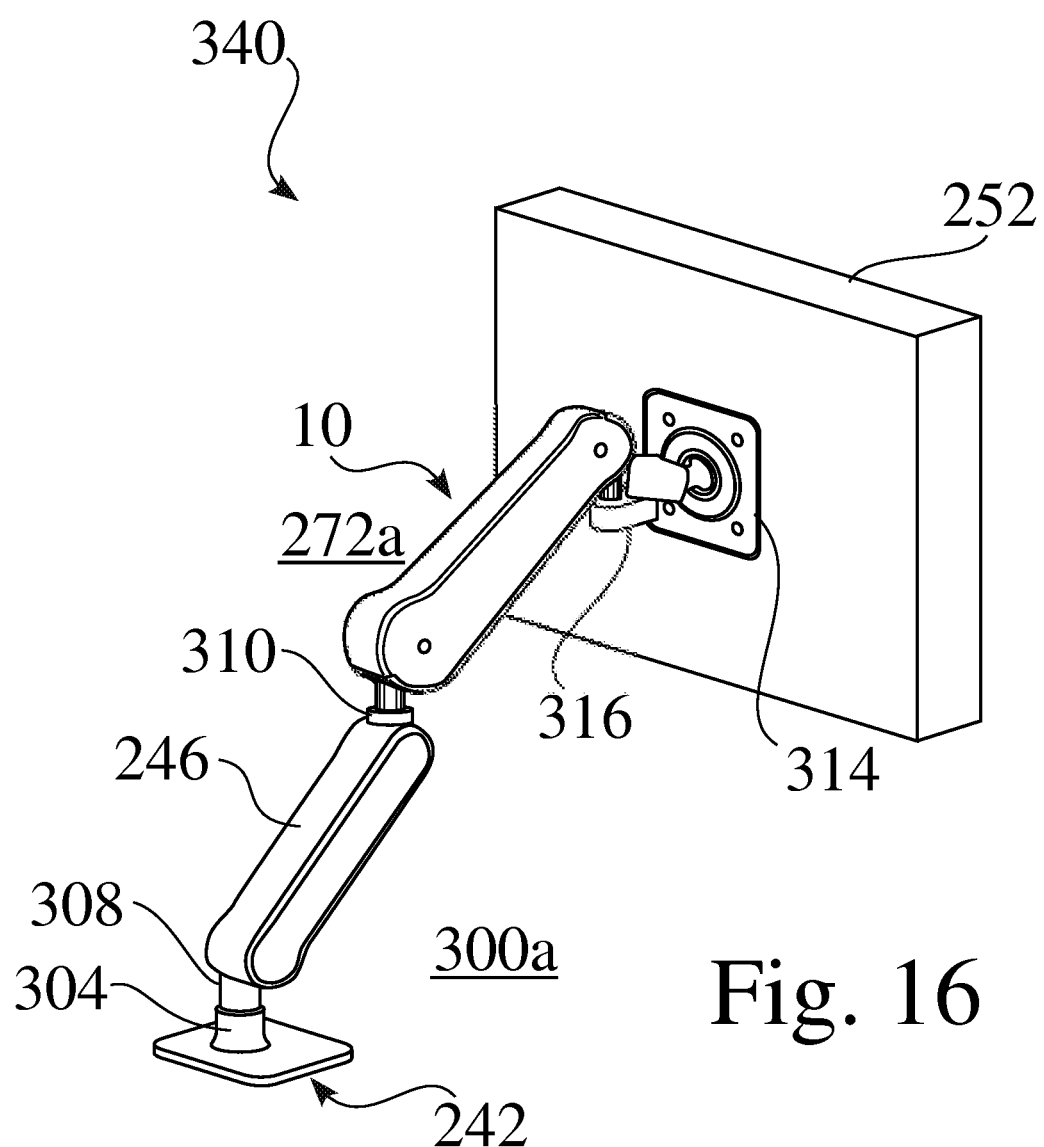
FIG. 16 is a perspective view of a mounting structure having an exemplary enhanced variable height arm in a generally upward position.

FIG. 14 is a perspective view of a mounting structure 300, e.g. 300a, having an exemplary enhanced variable height arm 10 in a generally downward position 272, e.g. 272k. FIG. 15 is a perspective view 320 of a mounting structure 300a having an exemplary enhanced variable height arm 10 in a generally horizontal position 272, e.g. 272e. FIG. 16 is a perspective view 340 of a mounting structure 300a having an exemplary enhanced variable height arm 10 in a generally upward position 272, e.g. 272a.

The components of the mounting structures 300 other than the variable height arm 10 may preferably comprise similar construction and materials as the variable height arm 10, such to avoid contamination and provide enhanced cleanability. For example, the top and sides of the extension arm 246 may preferably comprise a continuous smooth metal surface, such as with no fasteners or plastic covers, and may preferably be free of any gaps, ridges, tight corners or heavy texture that would make cleaning difficult.

Within a typical mounting system 300 having an enhanced variable height arm 10, the screen tilt may preferably be adjustable, such as between 20 degrees above and below vertical. In some embodiments, this range of adjustment is retained at any point within in the range of motion of the arm 10. The tilt mechanism may preferably rely on friction, wherein no additional counterbalance in the tilt mechanism is necessary. Within a typical mounting system 300 having an enhanced variable height arm 10, the screen may preferably be swiveled by as much as 90 to either side, wherein the tilt/swivel mechanism, e.g. 250, at the front of the arm 10 may preferably be prevented from marring or otherwise contacting the enhanced variable height arm 10 at the limits of this rotation.

The monitor interface 314, such as seen in FIG. 14, may preferably accommodate either or both 75 mm and 100 mm VESA hole patterns, such as based on Video Electronics Standards Association (VESA) Flat Display Mounting Interface (FDMI) Standards, e.g. VESA FDMI☐2006.

Adjustment of an Enhanced Variable Height Arm.

Figure 17:
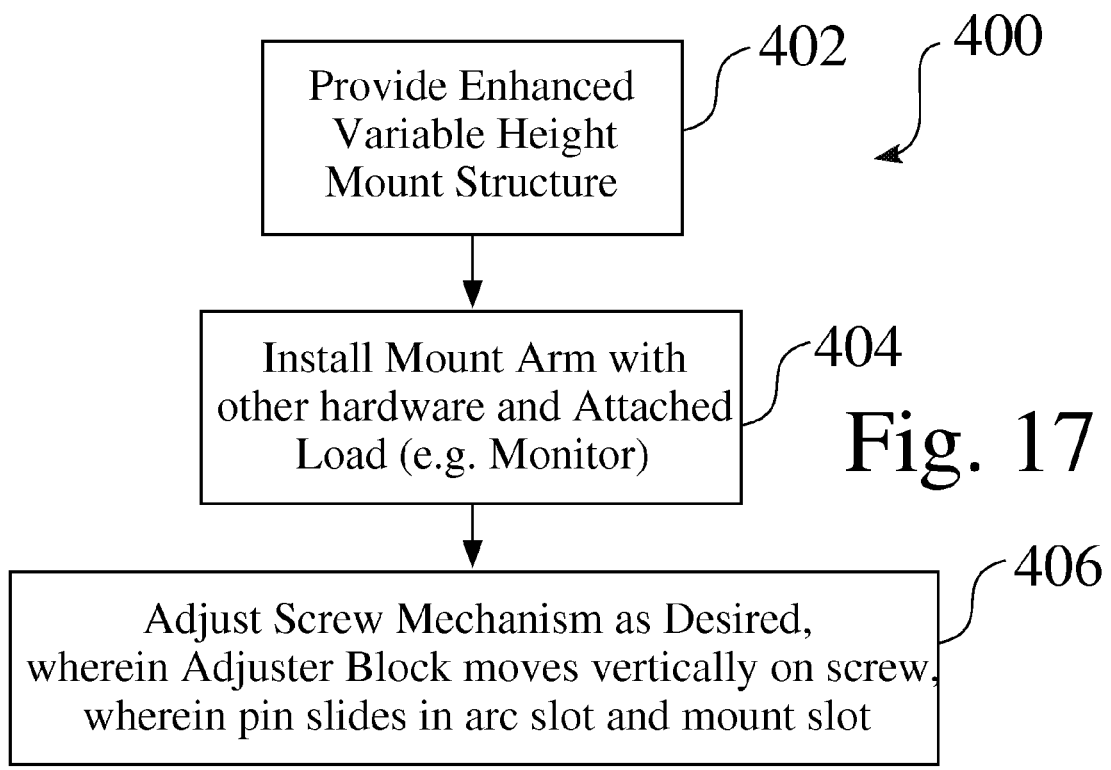
FIG. 17 is a flowchart of an exemplary process associated with in situ adjustment of an enhanced variable height arm.

FIG. 17 is a flowchart of an exemplary process 400 associated with in situ adjustment of counterbalancing for an enhanced variable height arm 10. For example, an enhanced variable height arm 10 is typically provided 402, which may have been previously adjusted 174 (FIG. 6), such as based upon an intended installation 300. In some embodiments, the enhanced variable height arm 10 is installed 404, such as with other associated hardware and an attached load 252, e.g. a monitor 252. The screw mechanism 52 for the enhanced variable height arm 10 is readily adjusted 406 to provide desired counterbalancing at a desired position 272, such as by turning the adjuster screw 52, which moves 164, e.g. 164u, 164d, the adjuster block 60 parallel to the adjuster screw 52 due to the engagement of threads 140,142, and moves the base pivot 41 within the curved or non-linear slot 40, as well as within the adjuster block slot 162.

While the exemplary enhanced variable height arm 10 is described herein as comprising a pivot adjustment mechanism 50 comprising an adjustment screw that engages an adjustment block 60 to move the pivot within the curved or non-linear slot 40, it should be understood that alternate mechanisms 50 may suitably be implemented to adjustably position the base pivot 41 at a desired position 150 within the curved or non-linear slot 40. For example, in a simplified arm structure 10, the base pivot 41 may comprise a bolt or screw 41 that may be tightened at a desired position 150 with respect to the curved or non-linear slot 40.

Cleaning of Enhanced Variable Height Arm.

Figure 18:
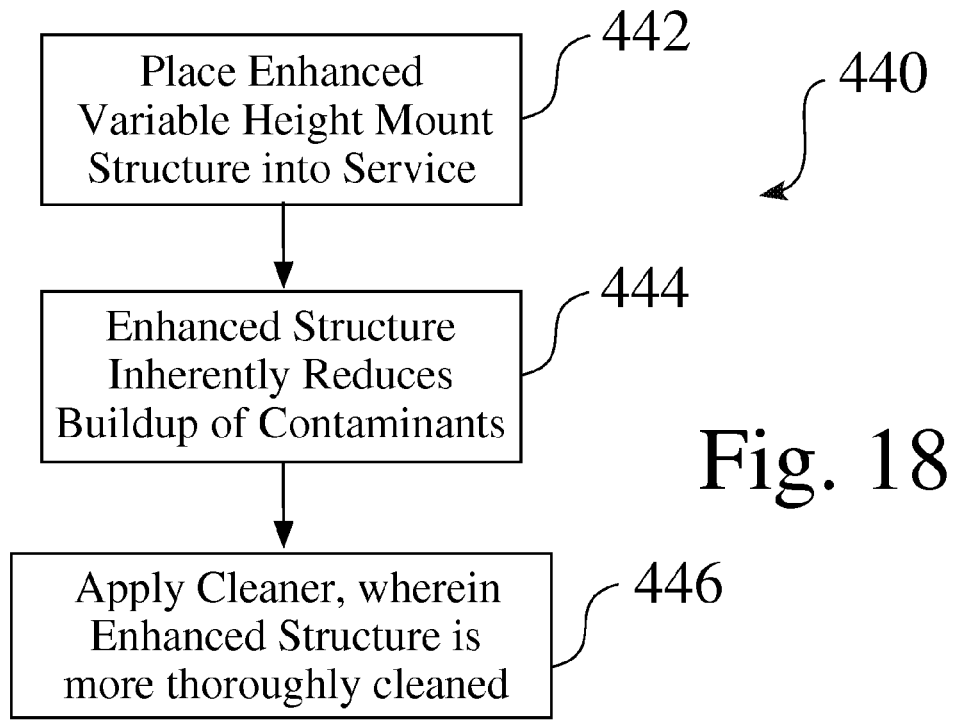
FIG. 18 is a flowchart of an exemplary process associated with in situ cleaning for an enhanced variable height arm.

FIG. 18 is a flowchart of an exemplary process 440 associated with in situ cleaning for an enhanced variable height arm 10. For example, once an enhanced variable height arm 10 is placed 442 into service, the enhanced structure inherently reduces 444 attachment or buildup of contaminants. As desired, a user, e.g. such as but not limited to hospital personnel, may apply cleaner and/or wipe down 446 the enhanced structure 10, whereby the enhanced structure is readily cleaned.

The enhanced variable height arm 10 may readily be used within a wide variety of mounting structures 300. For example, the enhanced variable height arm 10 is readily implemented for healthcare institutions that may need to ergonomically position a flat screen or small monitor 252, wherein the enhanced variable height arm 10 provides a highly cleanable and durable solution for mounting to a wall, a countertop, a work surface, or a movable structure.

Figure 19:
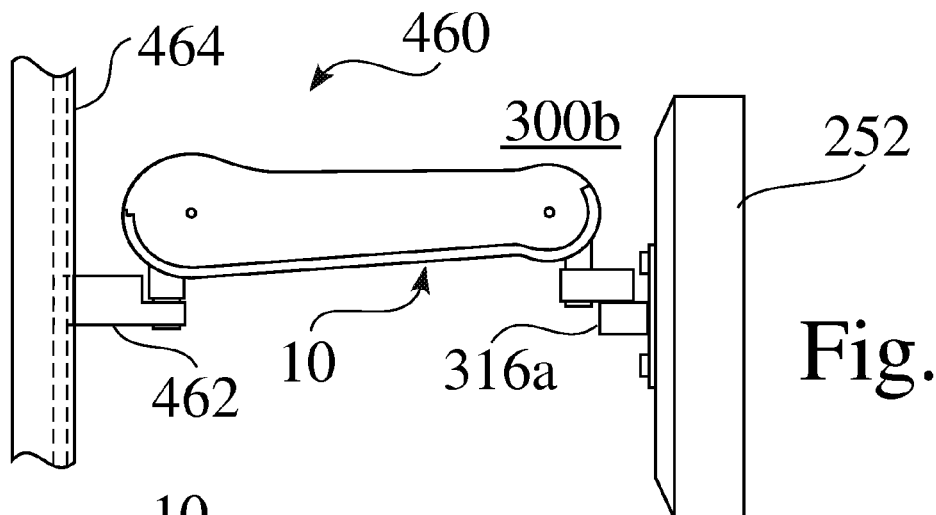
FIG. 19 is a schematic view of a mounting structure having an exemplary enhanced variable height arm, wherein the structure is configured for connection to a channel.

FIG. 19 is a schematic view 460 of a mounting structure 300b having an exemplary enhanced variable height arm 10, wherein the structure 300b is configured for connection to a channel 464. As seen in FIG. 19, an intermediate channel mount 462 may be adapted to directly or indirectly connect to a channel 464, such as but not limited to a stationary channel 464, on a wall of a patient room, or a channel 464 associated with a movable structure. An exemplary wall channel 464 is available through GCX, Inc., of Petaluma, Calif. The channel mount 462 may preferably be positioned or moved to any position along the channel 464, such as to a desired vertical position, or to a desired horizontal position, e.g. with respect to a work surface, such as to a appropriate surface having a thickness that may range from ⅜" to 2.5" thick. In some system embodiments 300, the channel 464 may be either clamped or thru-bolted.

Figure 20:
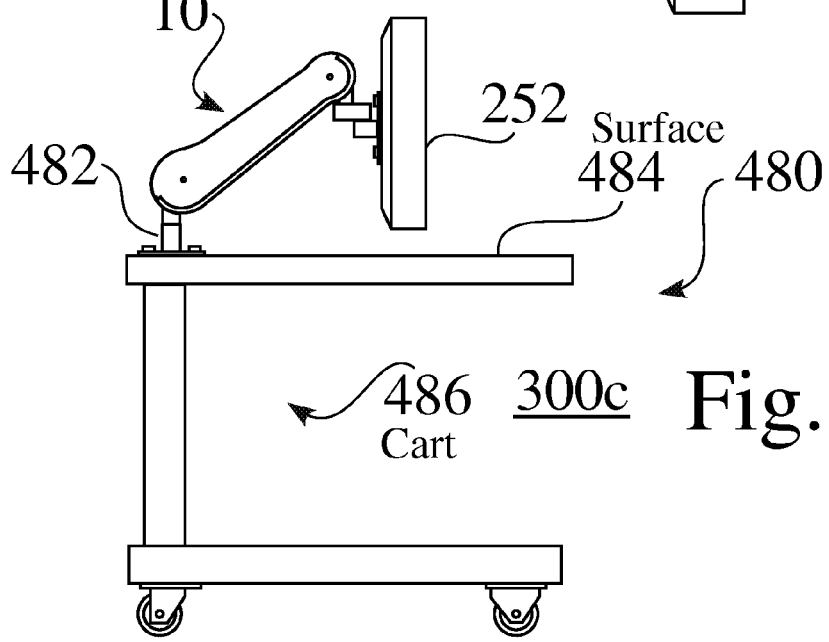
FIG. 20 is a schematic view of a mounting structure having an exemplary enhanced variable height arm, wherein the structure is configured for connection to a cart.

FIG. 20 is a schematic view 480 of a mounting structure 300c having an exemplary enhanced variable height arm 10, wherein the structure is configured for connection to a work surface 484, cart or a desk 486. For example, an enhanced variable height arm 10 may be fixedly or pivotably mounted to an intermediate mount 482, which may be fixed in relation to a cart or desk 486. Therefore, an enhanced variable height arm 10 may readily allow a flat panel display 252 to be mounted to a tabletop or desk, such as within a hospital or office environment. The enhanced variable height arm 10 may preferably be used to position a screen 252 off of the table or work surface 484, and may further provide some ergonomic adjustment, such as for any of height adjustment, side-to-side adjustment, screen tilt adjustment, and/or swivel adjustment. As seen in FIG. 10, wherein a mounting system 300 comprises an enhanced variable height arm 10 mounted to an extension arm 246, the combined structure allows arms 10,246 to be rotated with respect to each other, such as to provide fore-aft adjustment.

Figure 21:
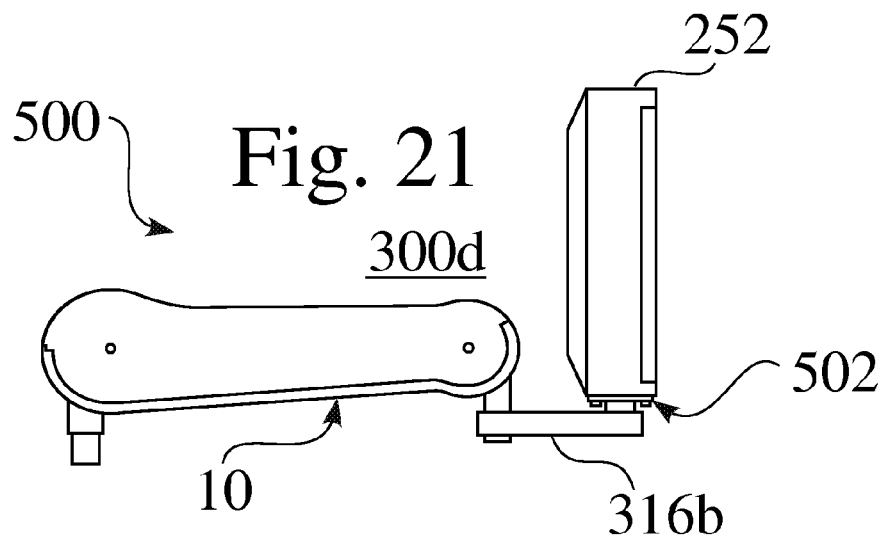
FIG. 21 is a schematic view of a mounting structure having an exemplary enhanced variable height arm, wherein the structure is configured for connection to a monitor having a bottom mount.

While the monitor 252 shown in FIG. 14, FIG. 15, and FIG. 16 is configured to be attached to a rear monitor bracket 314, other monitors 252 may require mounting from an alternate position. For example, FIG. 21 is a schematic view 500 of a mounting structure 300d having an exemplary enhanced variable height arm 10, wherein an intermediate monitor mount 316b is configured for connection to a monitor 252 having a bottom mount 502.

Figure 22:
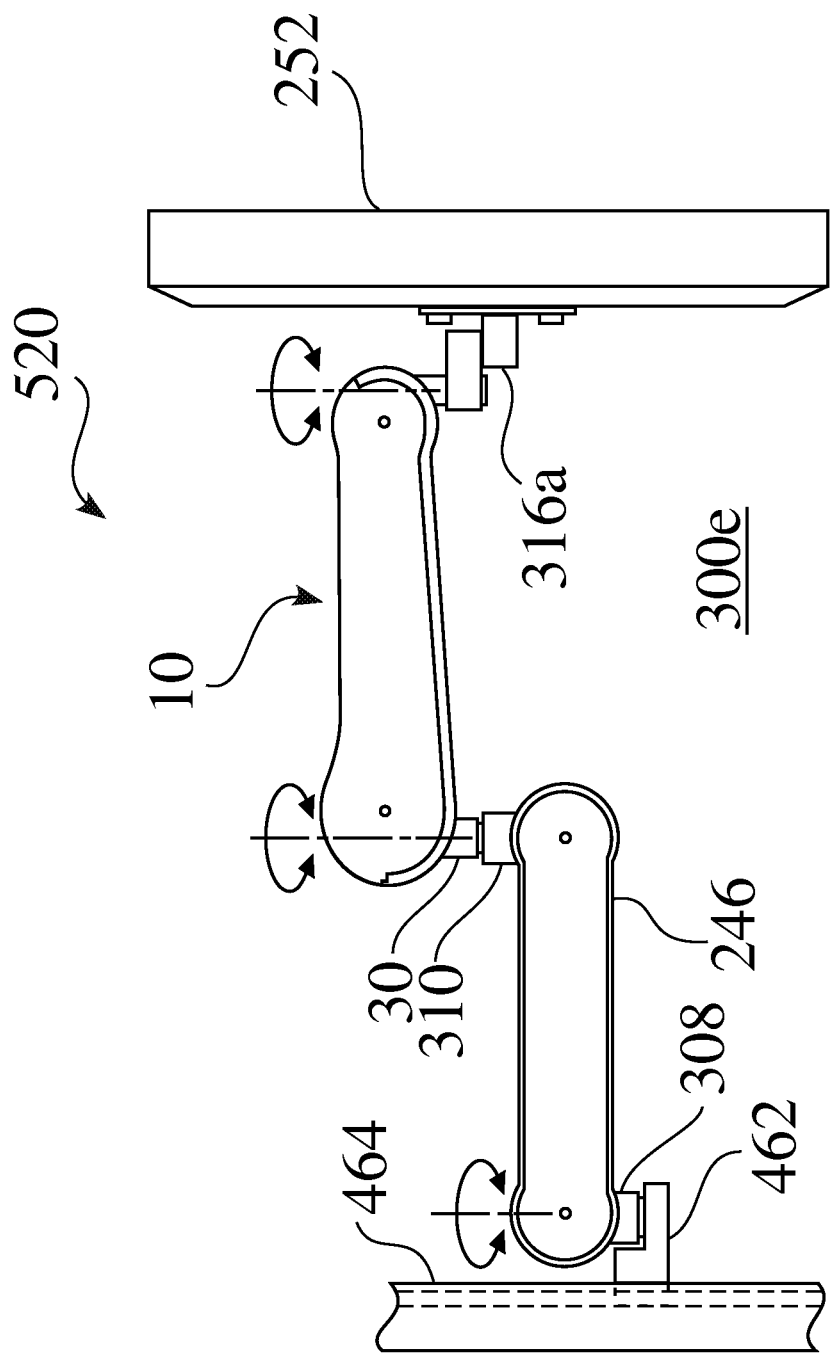
FIG. 22 is a schematic view of a mounting structure having an exemplary enhanced variable height arm and a rear extension arm, wherein the structure is configured for connection to a channel.

FIG. 22 is a schematic view 520 of a mounting structure 300e having an exemplary enhanced variable height arm 10 and a rear extension arm 246, wherein the structure 300e is configured for connection to a channel 464, or to a wall, such as through a bracket 462. While the exemplary rear extension arm 246 seen in FIG. 22 provides a generally horizontal extension 246, it should be understood that the extension arm 246 may alternately be configured for any of a wide variety of angles, and may itself be adjustable. The mounting structure 300e may readily be laterally adjusted as desired, such as to pivot the extension arm 246 with respect to the channel 464 and/or wall, to pivot the variable height arm 10 with respect to the extension arm 246, and/or to pivot the screen 252, e.g. through mount 316a, with respect to the enhanced variable height arm 10.

The enhanced variable height arm 10 may preferably be used for a wide range of devices 252, such as for but not limited to patient monitors, flat panel displays, and/or keyboard workstations. The enhanced variable height arm 10 may preferably be installed within a wide variety of hospital settings, such as but not limited to EDs, medical surgery facilities, intensive care units (ICU), operating rooms, test laboratories, dispensaries, offices, and/or common areas. The enhanced variable height arm 10 may preferably be mounted to a wall of a hospital or clinic, or adapted to an architectural headwall, column, rail system, or anesthesia machine. For example, the enhanced variable height arm 10 may preferably be installed within a nurse's central station or a telemetry multinscreen viewing area, to provide several years of service, regular adjustment and use, while being cleaned regularly.

While the enhanced variable height arm 10 may preferably be implemented within a wide variety of mounting environments, some embodiments of the enhanced variable height arm 10 may preferably be integrated for specific products, such as for original equipment manufacturer (OEM) devices. For example, any of size, load range, height adjustment range, materials, and/or coatings may preferably be integrated for an intended application, and the enhanced variable height arm 10 may be preadjusted, based on the intended device and application.

A rear extension arm 246 may preferably be integrated with the enhanced variable height arm 10 for a wide variety of installations. For example, for a table-mount system 300, a rear extension arm 246 may preferably extend upward from the surface of the table to minimize contact with papers and objects on the table when the arm is moved. For a wall-mount system, a rear extension arm 246 may preferably be installed in a horizontal configuration. The rear extension arm 246 is typically located below the enhanced variable height arm 10, between the enhanced variable height arm 10 and a fixed mount location, wherein the enhanced variable height arm 10 is fully rotatable over the extension arm 246.

While some embodiments of the enhanced variable height arm 10 do not require positive locking for any of the adjustments, some current embodiments of enhanced mount systems may preferably provide adjustable friction at one or more points, such as for any of:

screen tilt;

screen swivel;
arm-extension pivot; and/or
extension-base pivot.

The friction may preferably be adjustable continuously, such as from free□moving to essentially locked at each point. Adjustment of the friction may preferably be adjustable with common hand tools, e.g. hex keys or screwdriver, without disassembly of the arm 10.

While the enhanced variable height arm 10 may preferably provide many years and/or thousands of cycles of use and movement, adjustment of position, counterbalancing, and/or friction may readily be performed to compensate for wear or aging.

As well, while the enhanced variable height arm 10 and methods of use are schematically described herein, it should be understood that specific embodiments of the enhanced variable height arm 10 may suitably provide further functionality for specific applications. For example, clips or cable retention means may preferably be provided on some embodiments of the enhanced variable height arm 10, such as to allow cables to be routed along the arm, without kinking during arm movement. As necessary or desired, the enhanced variable height arm 10 may preferably comply with relevant standards, such as but not limited to medical electrical standards, e.g. IEC 60601-1. Similarly, wall mounted configurations of the arm 10 and mounting structures may preferably comply with applicable standards, e.g. such as but not limited to OSHPD approval, and/or compliance with current California Building Codes.

Furthermore, while some of the exemplary embodiments of the enhanced variable height arm and methods of use are described herein to provide structures for improved cleanability and improved counterbalancing, it should be understood that one or more of the improvements may be utilized separately. For example, while the slot 40 may preferably comprise a curved or non-linear slot 40 for some embodiments of the enhanced variable height arm, such as to provide enhanced adjustment of counterbalancing, it should be understood that some embodiments of arm structures may provide outer structures that offer improved cleanability, as disclosed within, without requiring such counterbalancing structures. Similarly, embodiments that provide improved counterbalancing may comprise a wide variety of outer shell structures.

Although the enhanced variable height arm and methods of use are described herein in connection with monitor support structures within a medical environment, the structures and techniques can be implemented for a wide variety of applications and environments, or any combination thereof, as desired.

For example, an enhanced variable height arm can be provided for a wide variety of business, educational, home, recreational, fitness or retail environments, wherein enhanced variable height arms can provide support for any of monitors, displays, touch screens, or other equipment.

Accordingly, although the invention has been described in detail with reference to a particular preferred embodiment, persons possessing ordinary skill in the art to which this invention pertains will appreciate that various modifications and enhancements may be made without departing from the spirit and scope of the claims that follow.

What is claimed is:

1. An arm structure, comprising:
  a mount arm comprising
    an arm pivot structure having a defined axis,
    a strut arm mount hole defined through the mount arm that is perpendicular to the axis of the arm pivot structure, and
    a bias element pivot hole defined through the mount arm that is perpendicular to the axis of the arm pivot structure and collinear to the strut arm mount hole;
  an adjuster box comprising
    a pivot structure having a defined axis,
    a strut mount hole that is perpendicular to the axis of the pivot structure,
    an inner hole defined through the adjuster box, wherein the inner hole is perpendicular to the axis of the pivot structure and collinear to the strut mount hole, and
    a slot defined through the adjuster box, wherein the slot comprises any of a curved slot or a non-linear slot, wherein the slot comprises a plurality of slot axes corresponding to a plurality of positions within the slot, and wherein the slot axes are perpendicular to the axis of the pivot structure and collinear to the strut mount hole and to the inner hole;
  a pivot adjustment screw having threads, wherein the pivot adjustment screw extends through the pivot structure along the pivot structure's defined axis;
  an adjuster block having a threaded hole that is threadably engaged to the pivot adjustment screw;
  a bias mount pin that is generally confined through the slot and through the adjuster block;
  a strut element that is pivotably attached between the strut arm mount hole and the strut mount hole;
  a bias element having a first end and a second end opposite the first end, wherein the first end is pivotably attached to the bias element pivot hole, and wherein the second end is pivotably attached to the bias mount pin at one of the plurality of positions;
  a continuous outer shell that is pivotably attached between the strut arm mount hole of the mount arm and the inner hole of the adjuster box, wherein the outer shell extends from an inner end to an outer end, and wherein the continuous outer shell has a first opening at the inner end through which the mount arm protrudes and a second opening at the outer end through which the adjuster box protrudes;
  an inner cover situated within an interior region of the continuous outer shell that surrounds the mount arm and shields at least some of the interior region exposed by the first opening; and
  an outer cover situated within the interior region of the continuous outer shell that surrounds the adjuster box and shields at least some of the interior region exposed by the second opening;
  wherein the strut element and the bias element are located within the interior region of the continuous outer shell.

2. The apparatus of claim 1, wherein the slot defines a radial arc.

3. The arm structure of claim 1, wherein the structure is configured such that rotational movement of the pivot adjustment screw results in longitudinal movement of the adjuster block with respect to the defined axis.

4. The arm structure of claim 3, wherein the longitudinal movement of the adjuster block with respect to the defined axis changes the location of the second end of the bias element with respect to the plurality of positions.

5. The arm structure of claim 4, wherein the plurality of positions provides selectable counterbalancing adjustment for the mounting arm.

6. The arm structure of claim 1, wherein the arm pivot structure of the mount arm is connectable to an extension arm.

7. The arm structure of claim 1, wherein the pivot structure of the adjuster box is connectable to a monitor mount mechanism.

8. The arm structure of claim 1, wherein the bias element comprises a gas spring.

9. The arm structure of claim 1, wherein the continuous outer shell comprises: an upper surface that extends from the inner end to the outer end;
   opposing sides that extend downward from the upper surface; and
   a lower cover that extends between and is fixedly attachable to the lower ends of the opposing sides of the upper surface, wherein the first opening and the second opening are in the lower cover.

10. The arm structure of claim 9, wherein the upper surface substantially covers the top of the arm structure, and wherein the arm structure further comprises:
    an outer pin attached between the opposing sides of the continuous outer shell and the mount arm; and
    an inner pin attached between the opposing sides of the continuous shell and the adjuster box.

11. The arm structure of claim 10, wherein the adjuster box extends downward from the interior region of the continuous outer shell through the second opening in the lower cover.

12. The arm structure of claim 10, wherein the mount arm extends downward from the interior region of the continuous outer shell through the first opening in the lower cover.

13. The arm structure of claim 10, wherein a substantially uninterrupted surface is formed by the upper surface, the lower cover, and the opposing sides.

14. An arm structure, comprising:
    a mount arm that includes
       an arm pivot structure having a defined axis,
       a strut arm mount hole defined through the mount arm that is perpendicular to the defined axis of the arm pivot structure, and
       a bias element pivot hole defined through the mount arm that is perpendicular to the defined axis of the arm pivot structure and collinear to the strut arm mount hole;
    an adjuster box that includes
       a pivot structure having a defined axis,
       a strut mount hole that is perpendicular to the defined axis of the pivot structure,
       an inner hole defined through the adjuster box, wherein the inner hole is perpendicular to the defined axis of the pivot structure and collinear to the strut mount hole, and
       a slot defined through the adjuster box, wherein the slot is a curved slot or a non-linear slot, wherein the slot comprises a plurality of slot axes corresponding to a plurality of positions within the slot, and wherein the slot axes are perpendicular to the defined axis of the pivot structure and collinear to the strut mount hole and to the inner hole;
    a pivot adjustment screw having threads, wherein the pivot adjustment screw extends through the pivot structure along the defined axis of the pivot structure;
    an adjuster block having a threaded hole that is threadably engaged with the pivot adjustment screw;
    a bias mount pin that is generally confined through the slot and through the adjuster block;
    a strut element that is pivotably attached between the strut arm mount hole and the strut mount hole;
    a bias element having a first end and a second end opposite the first end, wherein the first end is pivotably attached to the bias element pivot hole and the second end is pivotably attached to the bias mount pin at one of the plurality of positions;
    an outer shell that is pivotably attached between the strut arm mount hole of the mount arm and the inner hole of the adjuster box,
       wherein the outer shell is composed of an upper cover that extends from an inner end to an outer end, opposing sides that extend downward from the upper cover, and a lower cover that extends between the lower ends of the opposing sides,
       wherein the upper cover, the opposing sides, and the lower cover define an interior region of the outer shell within which the strut element and bias element are located, and
       wherein the lower cover has a first opening at the inner end through which the mount arm protrudes and a second opening at the outer end through which the adjuster box protrudes;
    an inner cover located within the outer shell that surrounds the mount arm and conceals at least some of the interior region exposed by the first opening; and
    an outer cover located within the outer shell that surrounds the adjuster box and conceals at least some of the interior region exposed by the second opening.

15. The arm structure of claim 14, wherein the upper cover, the lower cover, the opposing sides, or some combination thereof are composed of aluminum.

16. The arm structure of claim 14, wherein the exterior surfaces of the upper cover, the lower cover, the opposing sides, or some combination thereof are powder coated.

17. The arm structure of claim 14, wherein the inner cover, the outer cover, or both are composed of a polymer resistant to water and chemical degradation.

18. The arm structure of claim 17, wherein the polymer is polypropylene or polyethylene.

* * * * *